(12) United States Patent
Koga

(10) Patent No.: US 10,692,291 B2
(45) Date of Patent: Jun. 23, 2020

(54) APPARATUS, METHOD, AND MEDIUM FOR GENERATING A 3D MODEL OF A FINGER USING CAPTURED IMAGE

(71) Applicant: CANON KABUSHIKI KAISHA, Tokyo (JP)

(72) Inventor: Kazuhiro Koga, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 15 days.

(21) Appl. No.: 15/984,584

(22) Filed: May 21, 2018

(65) Prior Publication Data
US 2018/0336733 A1 Nov. 22, 2018

(30) Foreign Application Priority Data

May 22, 2017 (JP) .................................. 2017-101141

(51) Int. Cl.
| | | |
|---|---|---|
| G06T 19/00 | (2011.01) | |
| G06T 17/00 | (2006.01) | |
| G06T 7/60 | (2017.01) | |
| G06T 7/593 | (2017.01) | |

(52) U.S. Cl.
CPC ............ *G06T 19/006* (2013.01); *G06T 7/593* (2017.01); *G06T 7/60* (2013.01); *G06T 17/00* (2013.01); *G06T 2200/08* (2013.01); *G06T 2207/10012* (2013.01); *G06T 2207/30168* (2013.01); *G06T 2207/30196* (2013.01); *G06T 2207/30244* (2013.01)

(58) Field of Classification Search
CPC .............. G06T 19/006; G06K 9/00375–00389
See application file for complete search history.

(56) References Cited

U.S. PATENT DOCUMENTS

| | | | | |
|---|---|---|---|---|
| 10,168,873 | B1* | 1/2019 | Holz | .................... G06F 3/04842 |
| 2013/0163883 | A1* | 6/2013 | Takemoto | .......... G06K 9/00382 |
| | | | | 382/199 |
| 2013/0182902 | A1* | 7/2013 | Holz | ..................... G06K 9/3233 |
| | | | | 382/103 |
| 2014/0139340 | A1* | 5/2014 | Yang | ..................... G09B 19/003 |
| | | | | 340/573.1 |
| 2015/0213321 | A1* | 7/2015 | Okazaki | ............. G06K 9/00013 |
| | | | | 382/116 |

(Continued)

FOREIGN PATENT DOCUMENTS

JP 4071511 B2 4/2008

OTHER PUBLICATIONS

Fujishima, Noriaki, and Kiyoshi Hoshino. "Fingernail Detection Method from Hand Images including Palm." MVA. 2013. (Year: 2013).*

*Primary Examiner* — Daniel F Hajnik
(74) *Attorney, Agent, or Firm* — Rossi, Kimms & McDowell LLP

(57) ABSTRACT

An information processing apparatus comprises a determination unit configured to analyze a captured image of a finger and determine whether the captured image is a captured image appropriate to measure a dimension of a part of the finger; a measuring unit configured to measure a dimension of the finger using the captured image determined to be appropriate by the determination unit; and a generation unit configured to generate a model of a three-dimensional shape of the finger using information of the dimension.

17 Claims, 18 Drawing Sheets

(56) References Cited

U.S. PATENT DOCUMENTS

2015/0252980 A1* 9/2015 Maeda ............... G06K 9/00013
   382/115
2016/0373438 A1* 12/2016 Yoon ................... H04L 63/0861
2018/0120944 A1* 5/2018 Wang ...................... G06F 3/017

* cited by examiner

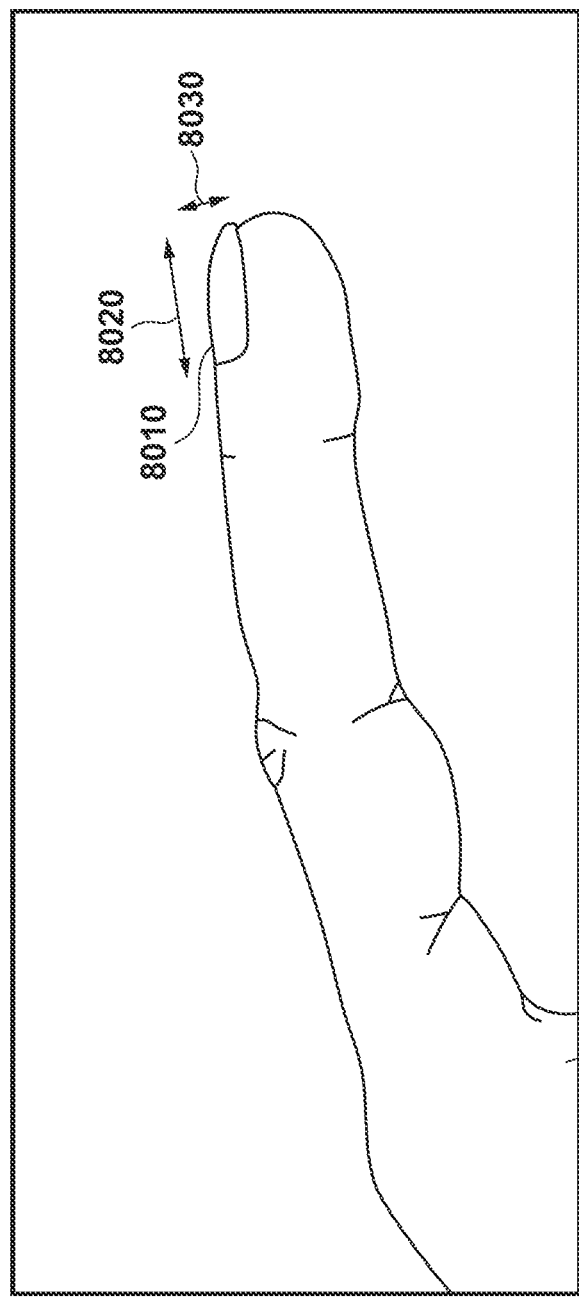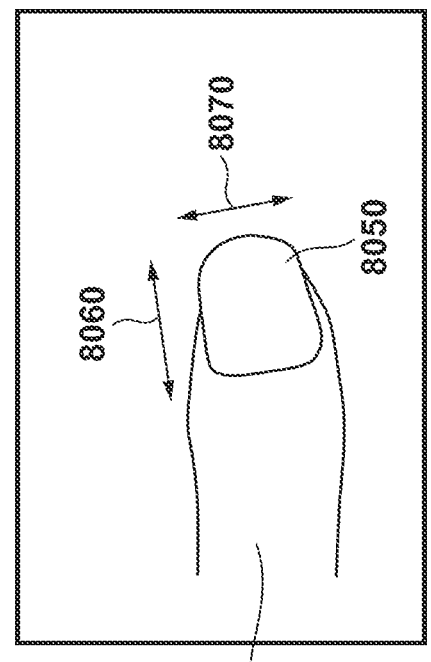

FIG. 11

| DIMENSION OF PART | | JU | | JM | | JL | |
|---|---|---|---|---|---|---|---|
| PART NAME | Hight | Width | Depth | Width | Depth | Width | Depth |
| TH0 | 30 | 15 | 11 | 21 | 16 | 22 | 18 |
| TH1 | 37 | 22 | 18 | 19 | 20 | 25 | 25 |
| NI0 | 23 | 12 | 8 | 15 | 12 | 17 | 14 |
| NI1 | 25 | 17 | 14 | 18 | 16 | 20 | 17 |
| NI2 | 48 | 20 | 17 | 18 | 21 | 20 | 20 |
| MI0 | 25 | 14 | 10 | 15 | 12 | 17 | 15 |
| MI1 | 30 | 17 | 15 | 16 | 16 | 20 | 18 |
| MI2 | 55 | 20 | 18 | 11 | 20 | 17 | 21 |
| TD0 | 21 | 13 | 10 | 15 | 13 | 16 | 12 |
| TD1 | 30 | 16 | 12 | 15 | 14 | 17 | 20 |
| TD2 | 53 | 17 | 20 | 16 | 19 | 17 | 21 |
| LT0 | 20 | 11 | 9 | 13 | 11 | 14 | 11 |
| LT1 | 22 | 14 | 11 | 12 | 11 | 13 | 12 |
| LT2 | 42 | 13 | 12 | 13 | 15 | 12 | 17 |
| PL | 105 | 83 | 27 | 107 | 35 | 64 | 34 |

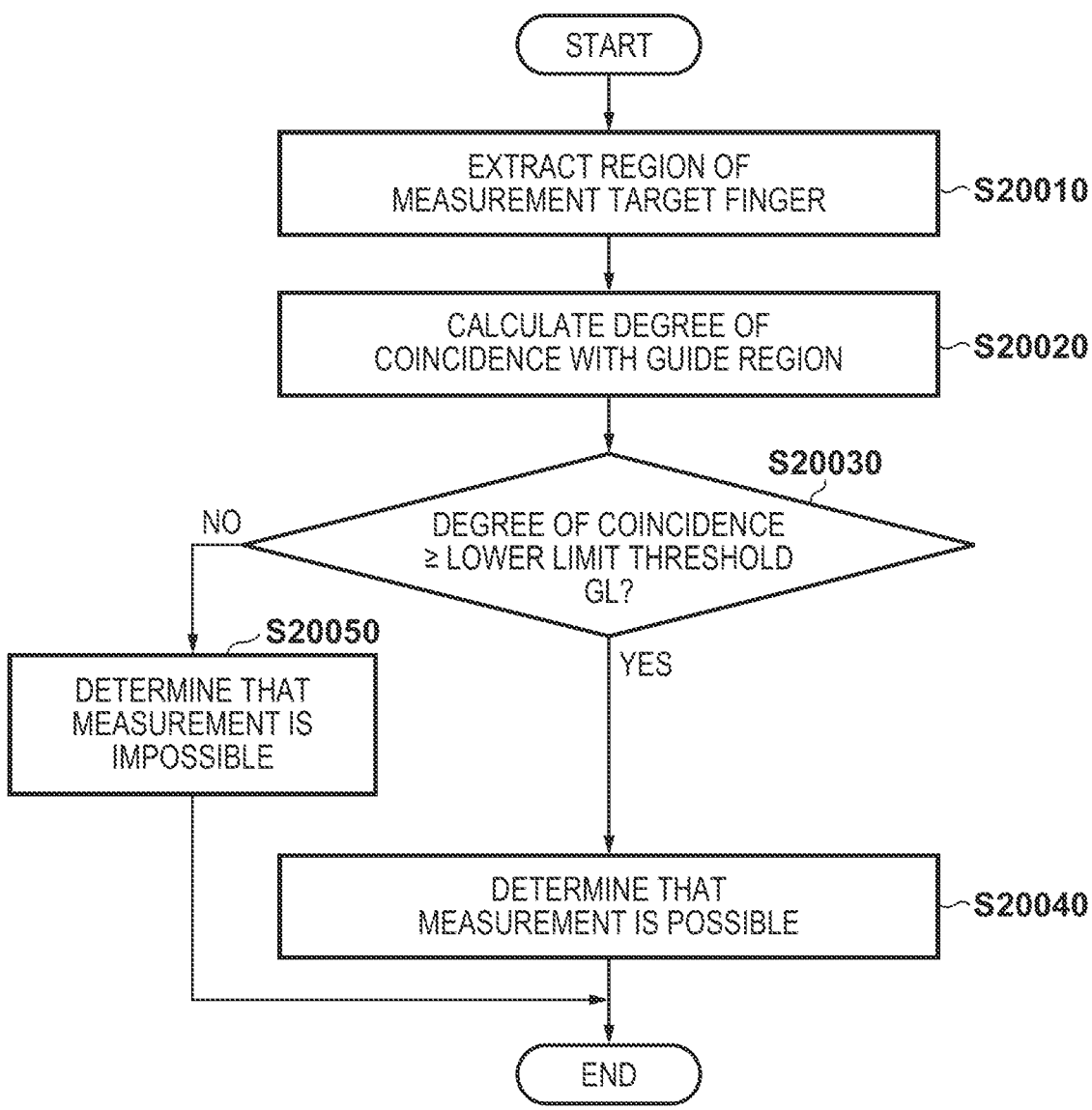

APPARATUS, METHOD, AND MEDIUM FOR GENERATING A 3D MODEL OF A FINGER USING CAPTURED IMAGE

BACKGROUND OF THE INVENTION

Field of the Invention

The present invention relates to an information processing apparatus, a method of controlling the information processing apparatus, and a non-transitory computer-readable storage medium.

Description of the Related Art

There exists an MR (Mixed Reality) technology for seamlessly merging a virtual space and a physical space created by a computer.

Application of the MR technology to various fields is now in progress, including an assembly examination in which a work procedure and wiring are displayed in a superimposed manner at the time of an assembly work. In the MR technology using a video see-through type HMD (Head Mounted Display), an image of a physical space is obtained from a camera that is an image capturing apparatus incorporated in the HMD, superimposed on a virtual object, and displayed on the display device of the HMD. To correctly express the front-rear relationship between a physical object (for example, a hand) and a virtual object by the MR technology, pieces of three-dimensional position information of the physical object and the virtual object are obtained. That is, the three-dimensional position information of the physical object is compared with the three-dimensional position information of the virtual object. If the physical object is located on the near side, the captured image is displayed on the near side. To correctly express the front-rear relationship, the three-dimensional position of the physical object is correctly obtained. In addition, if the shape (the length, width, and thickness) of the physical object is correct, the determination of the front-rear relationship can be performed more correctly.

Even in a use example in which it is determined whether a physical object comes into contact with a virtual object, and the virtual object is moved, the determination of the contact with the virtual object can also be performed more correctly if the three-dimensional position of the physical object and the shape (the length, width, and thickness) of each part of the physical object are correct. To express the three-dimensional shape of a physical object on a virtual space, application is also under way in which, for example, a three-dimensional model of the physical object is generated, and the front-rear determination or contact determination of a virtual object is performed.

Japanese Patent No. 4071511 discloses a method of creating a three-dimensional shape model of a hand by obtaining the coordinate values and bending angles of fingers and palm of a real hand and adding the data of the thickness of each finger and the thickness of the palm which are measured in advance.

However, Japanese Patent No. 4071511 does not disclose a method of measuring the dimension data of the thickness of each finger and the thickness of the palm. In addition, to create the three-dimensional shape model of a finger, a work of separately measuring the dimension data is necessary. Furthermore, the dimension data needs to be manually input to a computer system. Hence, if the dimension measurement as a prior work is not correct, the accuracy of front-rear determination or contact determination of a virtual object lowers. In addition, since a physical object like a hand has a complex shape and many parts, manually inputting dimension data needs much time and effort, and a typing error or an input error such as input of data of another object may occur.

As described above, in the technique described in Japanese Patent No. 4071511, time and effort to input dimension data are needed, and inaccurate dimension data may be input.

The present invention has been made in consideration of the above-described problems, and provides a technique for collecting accurate dimension data without time and effort and generating a model of a finger.

SUMMARY OF THE INVENTION

According to one aspect of the present invention, there is provided an information processing apparatus comprising: a determination unit configured to analyze a captured image of a finger and determine whether the captured image is a captured image appropriate to measure a dimension of a part of the finger; a measuring unit configured to measure a dimension of the finger using the captured image determined to be appropriate by the determination unit; and a generation unit configured to generate a model of a three-dimensional shape of the finger using information of the dimension.

Further features of the present invention will become apparent from the following description of exemplary embodiments with reference to the attached drawings.

BRIEF DESCRIPTION OF THE DRAWINGS

FIGS. 8A and 8B are schematic views for explaining an example of a target image for which dimension measurement enable/disable determination according to the first embodiment is performed;

FIG. 11 is a schematic view for explaining a dimension information table according to the first embodiment;

FIG. 20 is a flowchart showing dimension measurement enable/disable determination processing of the information processing apparatus according to the fifth embodiment.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Outline>

In this embodiment, an example will be described in which a hand (for example, 150 in FIG. 1) of a user is captured by stereo cameras (for example, an image capturing apparatus 100 and an image capturing apparatus 110), and the depth value and the three-dimensional shape of the region of the hand are estimated. Then, based on the estimation result, an image of a CG model (for example, 160 in FIG. 1) is processed in accordance with the front-rear relationship between the CG model (for example, 160 in FIG. 1) and the hand (for example, 150 in FIG. 1) and displayed in combination with a real captured image on a display (for example, 208 in FIG. 1).

<Functional Arrangement of Information Processing Apparatus>

Figure 1:
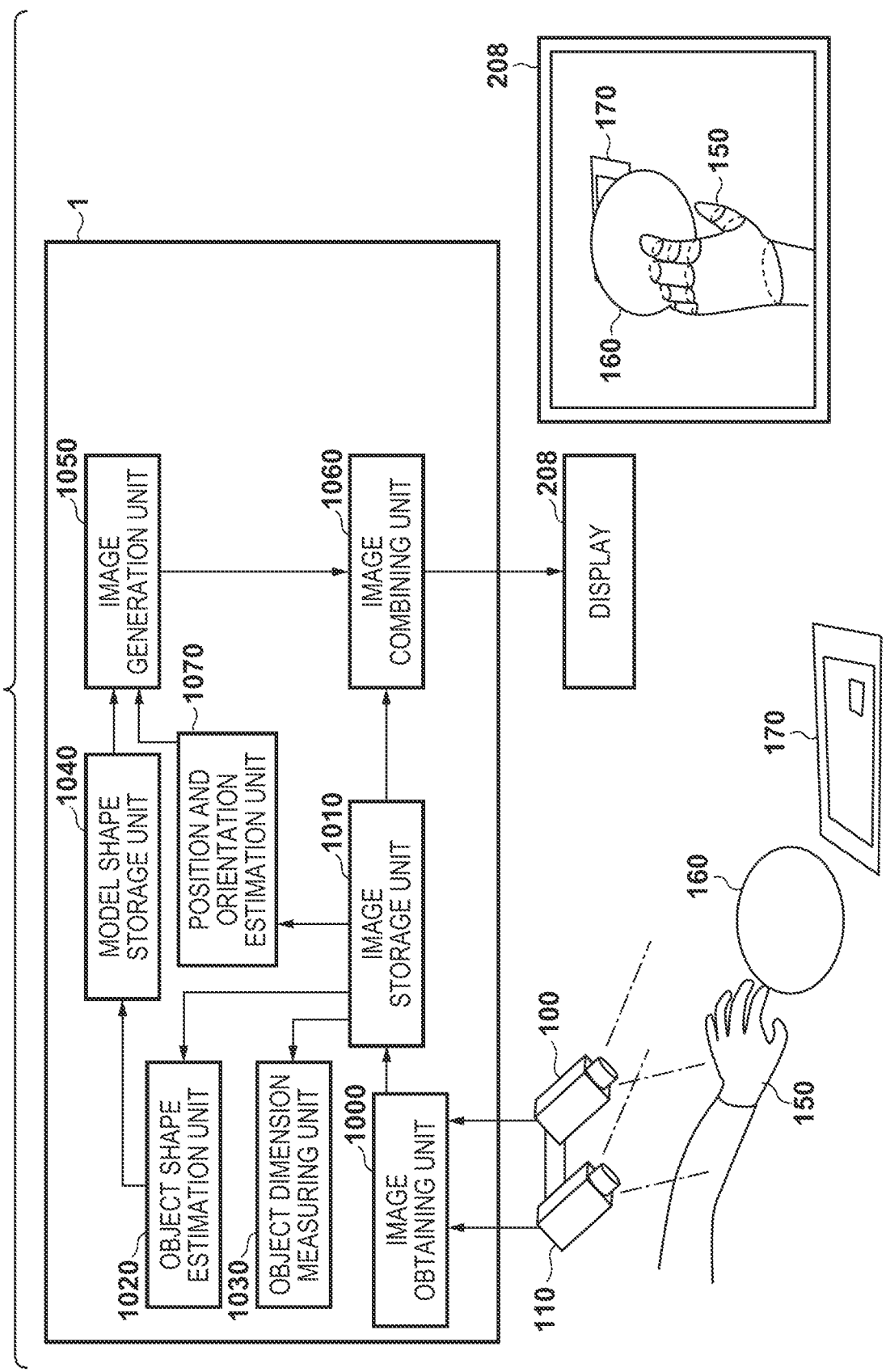
FIG. 1 is a block diagram showing the arrangement of an information processing apparatus according to the first embodiment.

FIG. 1 is a block diagram showing the functional arrangement of an information processing apparatus according to the first embodiment, which estimates the three-dimensional shape of a physical object. An information processing apparatus 1 includes an image obtaining unit 1000, an image storage unit 1010, an object shape estimation unit 1020, an object dimension measuring unit 1030, a model shape storage unit 1040, an image generation unit 1050, an image combining unit 1060, and a position and orientation estimation unit 1070.

The image obtaining unit 1000 obtains stereo images obtained by the image capturing apparatuses 100 and 110. Videos from the image capturing apparatuses 100 and 110 are used as processing images for stereo measurement and are therefore assumed to be fixed to each other. The captured videos are assumed to include the hand 150 of the operator and a marker 170 used to measure the positions and orientations of the image capturing apparatuses 100 and 110.

The image storage unit 1010 temporarily stores the videos obtained by the image obtaining unit 1000. The image obtaining unit 1000 transmits image data, for example, every 1/30 sec. The object shape estimation unit 1020 obtains the stereo images stored in the image storage unit 1010 and calculates the three-dimensional shape of the hand 150. A method of calculating the three-dimensional shape of the hand 150 will be described later. The object shape estimation unit 1020 outputs the three-dimensional shape of the hand 150 to the model shape storage unit 1040.

The object dimension measuring unit 1030 obtains the images stored in the image storage unit 1010 and calculates the dimension of each part of the hand 150 necessary for the object shape estimation unit 1020 to perform shape estimation. A method of calculating the dimension of each part of the hand 150 will be described later. The object dimension measuring unit 1030 holds the dimension information of each part of the hand 150 such that the information can be used by the object shape estimation unit 1020 to estimate the three-dimensional shape of the hand.

The model shape storage unit 1040 holds the three-dimensional model data of the CG model 160 and the data of the three-dimensional shape of the hand 150 received from the object shape estimation unit 1020. The held data are output to the image generation unit 1050.

The position and orientation estimation unit 1070 measures the camera positions and orientations of the image capturing apparatuses 100 and 110. In this embodiment, the position and orientation of each image capturing apparatus are estimated based on the projected image of the square marker 170 included in the captured image. For example, the image is binarized, the apexes of the rectangle are extracted, and a projection error on the image is minimized by a repetitive operation of a hill-climbing method, thereby estimating the camera position and orientation. Note that the position and orientation of each image capturing apparatus may be measured using another measuring method such as a motion capture apparatus or a magnetic sensor.

The image generation unit 1050 generates an image of the CG model 160 based on the three-dimensional shapes of the CG model 160 and the hand 150 stored in the model shape storage unit 1040, and the viewpoint positions and orientations of the image capturing apparatuses 100 and 110 obtained from the position and orientation estimation unit 1070. The image generation unit 1050 performs comparison concerning the front-rear relationship between the hand 150 and the drawing pixels of the CG model 160, and determines whether to draw the CG model. That is, if it is determined that the hand 150 is located on the near side of the CG model 160, the CG model 160 is not drawn on the pixels, and instead, the image combining unit 1060 processes the image of the CG model 160 so as to show the hand in the real captured video.

The image combining unit 1060 overwrites the image of the three-dimensional shape of the CG model 160 generated by the image generation unit 1050 on each of the images of the image capturing apparatuses 100 and 110 stored in the image storage unit 1010 and combines the images. At this time, a CG model of a hand generated by modeling the three-dimensional shape of the hand 150 may be combined, or only the hand in the real captured image may be shown without overwriting the CG model of the hand. The generated combined image is output to the display 208 to visually present the front-rear relationship between the CG model 160 and the hand 150 to the user.

In addition, the image storage unit 1010 inputs the real captured image used in the processes of the object shape estimation unit 1020, the position and orientation estimation unit 1070, and the image generation unit 1050 to the image combining unit 1060. This is done to cause the image combining unit 1060 to combine the images in a state in which the image of the three-dimensional shape generated by the image generation unit 1050 and the image in the image storage unit 1010 are synchronized.

<Hardware Arrangement of Information Processing Apparatus>

Figure 2:
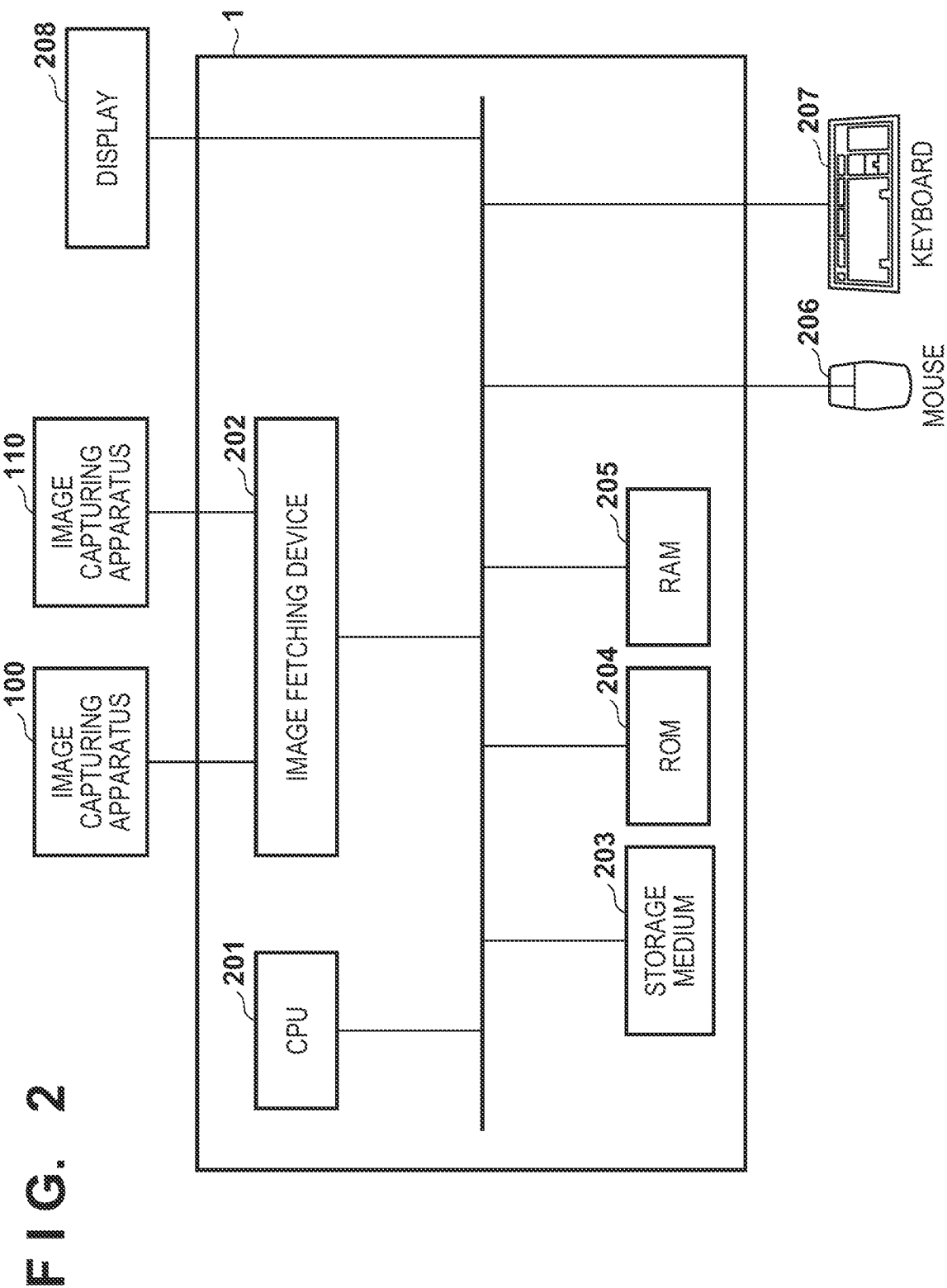
FIG. 2 is a block diagram showing the hardware arrangement of the information processing apparatus according to the first embodiment.

Next, FIG. 2 is a schematic view showing the hardware of the information processing apparatus for implementing the embodiment. The information processing apparatus 1 includes a CPU 201, an image fetching device 202, a storage medium 203, a ROM 204, and a RAM 205, and is connected to a mouse 206, a keyboard 207, and the display 208. In addition, the image capturing apparatuses 100 and 110 are connected to the image fetching device 202.

The CPU 201 executes a program stored in the ROM 204 using the RAM 205 as a work memory and generally controls each component to be described later. Various processes to be described later are thus executed.

The image fetching device 202 receives image signals output from the connected image capturing apparatuses 100 and 110 and fetches them as frame images. The storage medium 203 is a readable/writable storage device and may be a flash memory or an HDD, or a storage device such as an optical disk drive.

The ROM 204 is a non-rewritable nonvolatile memory and has a function as a storage device for programs and permanent data. The CPU 201 can perform data read from the ROM 204 and data read/write from/to the storage medium 203.

The RAM 205 is a work memory capable of high-speed read/write. In addition, a program is loaded into the RAM 205 and executed by the CPU 201. The RAM 205 also serves as an area to temporarily store, for example, an image fetched by the image fetching device 202.

The mouse 206 and the keyboard 207 are interfaces used by the user to operate the information processing apparatus 1, and are used to instruct setting and control of the apparatus. The display 208 is formed by a CRT, a liquid crystal screen, or the like, and can display various kinds of information by an image, characters, or the like. Note that constituent elements other than those described above also exist as the constituent elements according to this embodiment. However, they are not included in the gist of the present invention, and a description thereof will be omitted.

<Processing>

Figure 3:
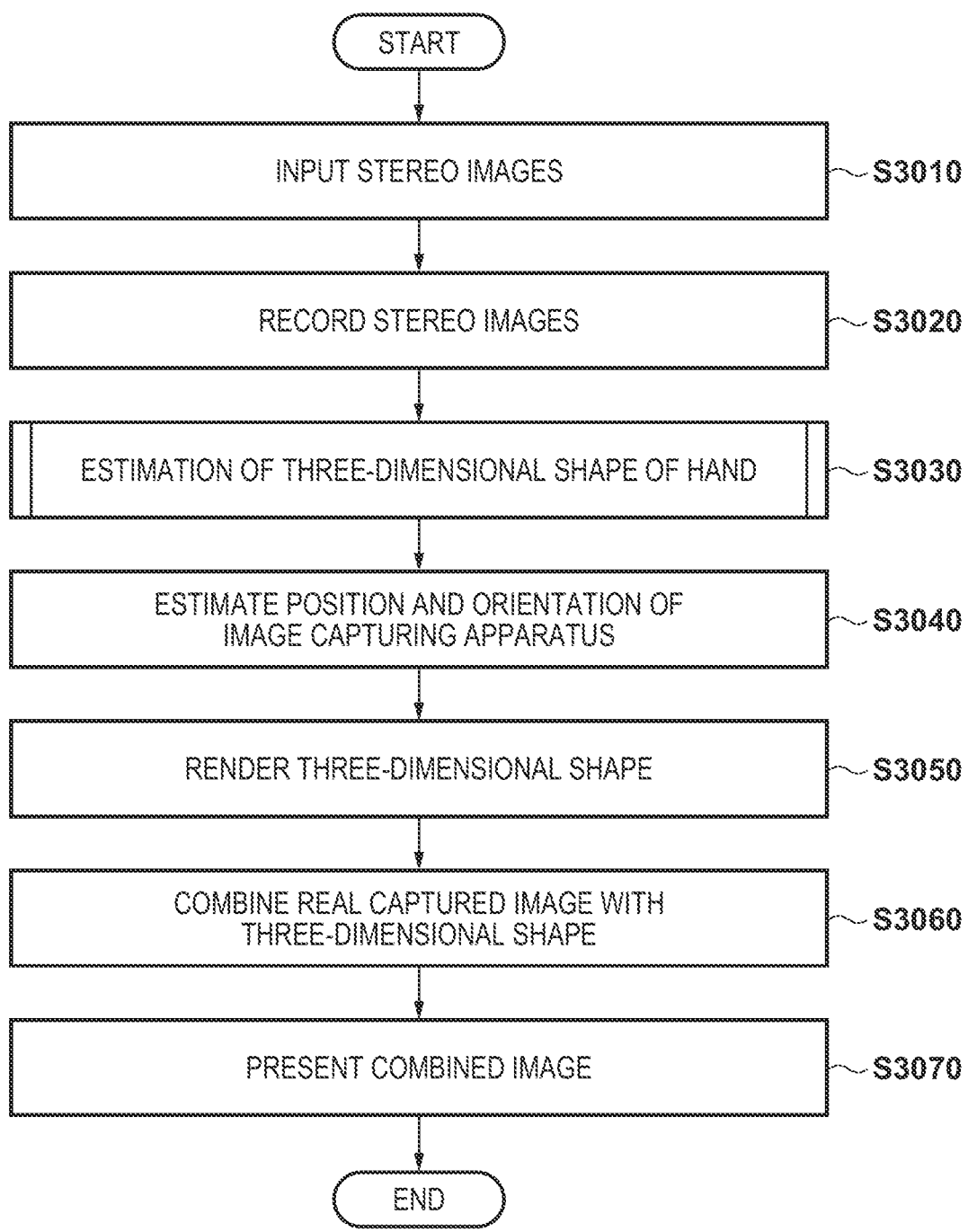
FIG. 3 is a flowchart showing processing of the information processing apparatus according to the first embodiment.

FIG. 3 is a flowchart showing the procedure of overall processing executed by the information processing apparatus according to this first embodiment. In step S3010, the image obtaining unit 1000 obtains images from the image capturing apparatuses 100 and 110.

In step S3020, the image storage unit 1010 temporarily records the stereo images obtained from the image obtaining unit 1000 in a memory (for example, the RAM 205). In step S3030, the object shape estimation unit 1020 extracts the region of the hand 150 included in the stereo images in the image storage unit 1010, and estimates the three-dimensional shape of the hand. Details of this step will be described later with reference to FIG. 4.

In step S3040, the position and orientation estimation unit 1070 estimates the position and orientation of at least one of the image capturing apparatuses 100 and 110. The estimated position and orientation are used by the image generation unit 1050 to render a CG model.

In step S3050, the image generation unit 1050 obtains the three-dimensional shape of the hand 150 and the shape of the CG model 160, which are stored in the model shape storage unit 1040, and the position and orientation of the image capturing apparatus measured by the position and orientation estimation unit 1070. In addition, the image generation unit 1050 draws the image of the CG model 160 viewed from the position and orientation of the image capturing apparatus. When drawing, the distances of the hand 150 and the CG model 160 from the image capturing apparatus are determined for each drawing pixel, and for a pixel for which the hand 150 is located on the near side, the CG model 160 is not drawn and is set in a transparent state. That is, the image combining unit 1060 shows the real captured video on the near side, thereby presenting the image of the hand 150 to the user.

In step S3060, the image combining unit 1060 overwrites the image of the CG model 160 generated in step S3050 on the real captured video recorded in step S3020 and combines the images. In step S3070, the image combining unit 1060 outputs the combined image generated in step S3060 to the display 208.

Figure 4:
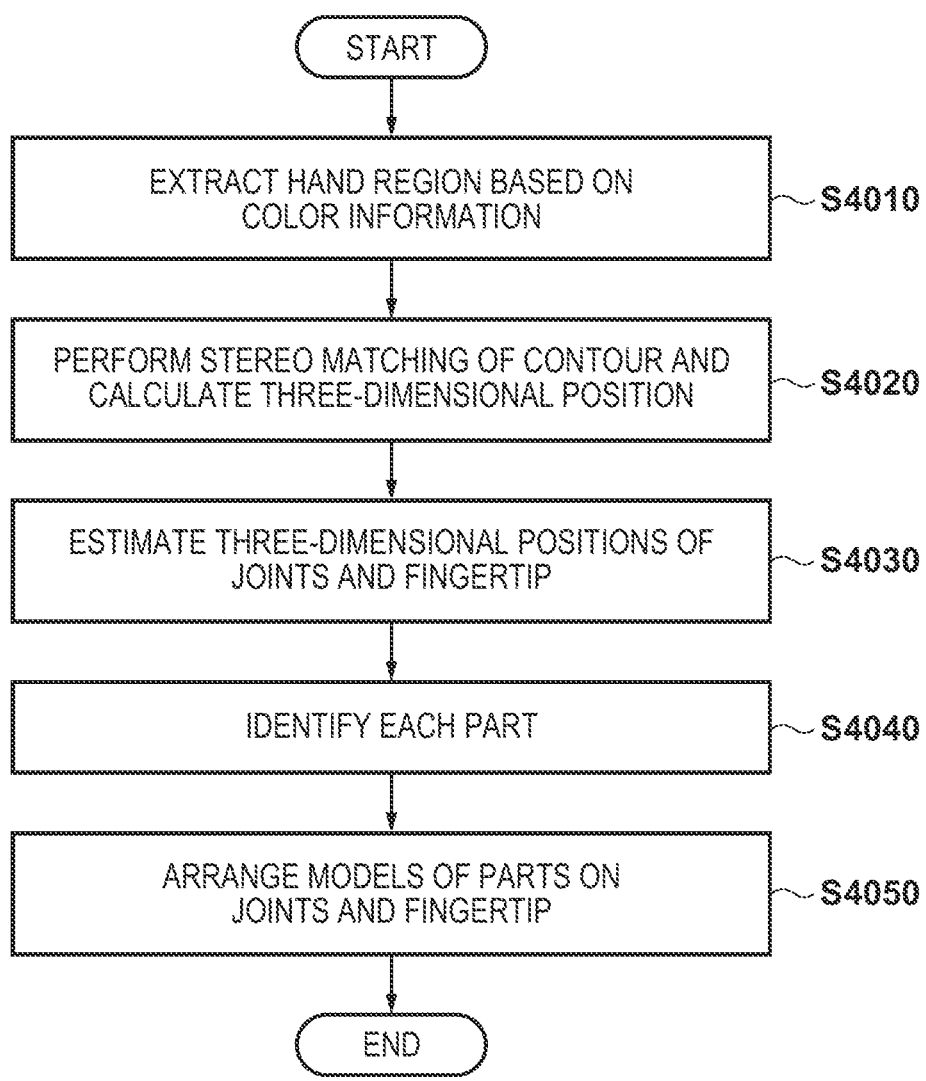
FIG. 4 is a flowchart showing estimation processing of the three-dimensional shape of a hand by the information processing apparatus according to the first embodiment.

Details of the estimation processing of the three-dimensional shape of the hand in step S3030 will be described next with reference to the flowchart of FIG. 4. In step S4010, the object shape estimation unit 1020 extracts the region of the hand 150 that is a target object from each of the images of the image capturing apparatuses 100 and 110 recorded in the image storage unit 1010.

In this embodiment, the region of the target object is extracted based on the color information of pixels. That is, for a hand, a method of registering the flesh color information of a hand in advance and extracting a color region that coincides with the flesh color information from the real captured image as a target object region is used. Note that not the method using color information but another method of, for example, obtaining a contour from edge information obtained by binarizing an image may be used, and any method is applicable as long as it can obtain the region of the target object.

In step S4020, the object shape estimation unit 1020 associates the sampling points of contours in the left and right images with the contour line coordinate list of the region extracted in step S4010 by stereo matching processing. In this stereo matching processing, for example, to associate sampling points in the image for the left eye with sampling points in the image for the right eye, an epipolar line is drawn on the upper side of the right eye. Then, matching is performed using the sampling points of the contour close to the epipolar line as corresponding points.

Note that the present invention is not limited to using an epipolar line for stereo matching, and any method capable of corresponding points is usable, such as a method of searching for an image correlation in the peripheral region of a sampling point.

In addition, the object shape estimation unit 1020 decides the depth value of each corresponding point using triangulation (FIG. 7) based on the corresponding information of the obtained corresponding point, the relative positions and orientations of the left and right stereo cameras of the image capturing apparatuses 100 and 110, and the internal parameters (lens distortions and perspective projection conversion information) of the cameras. The depth values of all corresponding points are calculated, and three-dimensional positions (X, Y, Z) of the corresponding points on the image capturing means are held on the RAM 205 as a corresponding point list. Note that the present invention is not limited to the depth estimation method using stereo images, and any method capable of obtaining a three-dimensional position is applicable, such as a method using a depth value measured by a depth sensor.

In step S4030, the object shape estimation unit 1020 estimates the positions of the joints and the fingertips of fingers from the three-dimensional positions of the corresponding points stored in the corresponding point list. In this position estimation processing for the joints and fingertips, for example, a hand image database (not shown) in which the pieces of position information of the joints and the fingertip of each finger are registered together with images is searched for a shape that is most similar to the extracted image of the hand obtained by target object region extraction. There is a method of estimating the positions from the position information of the fingertip and the joints in a hit registered image. In this case, a corresponding point most adjacent to a point at a joint position in an image is searched for from the above-described corresponding point list, thereby estimating the position of a joint or a fingertip. As another method, there is a method of estimating a joint or a fingertip by detecting a nail or wrinkles of a joint. In the present invention, any method capable of estimating the position of a fingertip or a joint is applicable.

In step S4040, the object shape estimation unit 1020 performs identification of parts from the position information of the joints and the fingertips obtained in step S4030. As for the parts, for example, the part from the fingertip of a thumb to the first joint is the first part of the thumb, and the part from the first joint to the second joint is the second part of the thumb. The classification of the parts will be described later using an example of a hand model with reference to FIG. 5. As for the identification of the parts, when each part is obtained by the method of searching the hand image database for a most similar hand image in step S4030, the information of each part is also added to the image in the database.

In such a database, when the addition information of a database image is referred to at the point of time when the image of the most similar shape is obtained from the database, which position of the image corresponds to which part can be identified. In addition, when the method of estimating a joint or a fingertip by detecting a nail or wrinkles of a joint is used, a finger is specified based on the ratio of the lengths between the joints or the like, thereby identifying a part. By this part identification processing, a part to which a joint or a fingertip obtained in step S4030 belongs can be specified.

Finally, in step S4050, the object shape estimation unit 1020 arranges the three-dimensional models of the parts on the fingertip and the joints of the parts, thereby estimating the three-dimensional model shape of the entire hand. More specifically, as for a thumb, the three-dimensional model of the first part of the thumb is arranged on the points of the fingertip and the first joint of the thumb, and the three-dimensional model of the second part of the thumb is arranged between the points of the first joint and the second joint. The series of processes is performed for the parts of all fingers and the palm, thereby generating the three-dimensional model of the hand whose shape is estimated.

Figure 5:
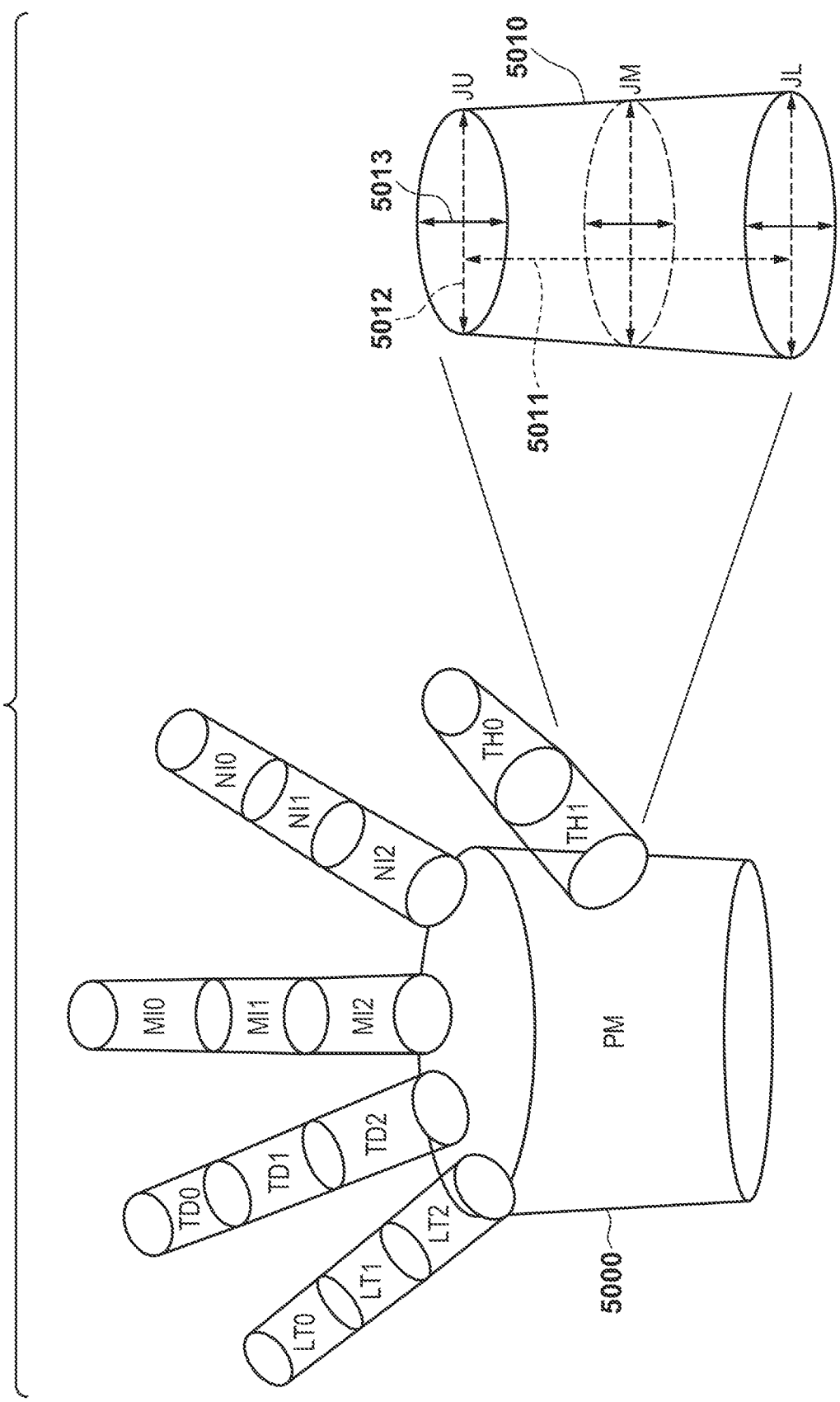
FIG. 5 is a schematic view showing an example of the three-dimensional model of a hand according to the first embodiment.

Here, FIG. 5 is a schematic view of the three-dimensional model of a hand according to this embodiment. A detailed three-dimensional model of a hand and its parts will be described with reference to FIG. 5. A three-dimensional model 5000 of a hand includes five fingers and a palm portion. A thumb is divided into two parts, and each of the remaining fingers is divided into three parts. Hence, the three-dimensional model is formed by 15 parts.

Each part is assigned a label to identify the part. In this embodiment, labels TH0 and TH1 assigned to the thumb, labels NI0, NI1, and NI2 are assigned to the index finger, labels MI0, MI1, and MI2 are assigned to the middle finger, labels TD0, TD1, and TD2 are assigned to the ring finger, labels LT0, LT1, and LT2 are assigned to the little finger, and a label PM is assigned to the palm.

To decide the shape of each part, pieces of information of dimensions are necessary. For example, to create the shape of a part model 5010 of the part TH1 of the thumb, pieces of information of a height 5011, a width 5012, and a depth 5013 are necessary. In this embodiment, pieces of information of the width and the depth are defined at each of three portions, that is, an upper portion JU, a middle portion JM, and a lower portion JL of the part. To more correctly express the shape, the information may be defined more finely.

To generate the three-dimensional model of a hand, pieces of dimension information of each part are necessary, as described above with reference to FIG. 5. As an explanation of the object dimension measuring unit 1030 that performs processing of obtaining the dimensions, the overall processing procedure of dimension measurement will be described with reference to the flowchart of FIG. 6.

In step S6010, the object dimension measuring unit 1030 refers to the image obtained by the image obtaining unit 1000, which is stored in the image storage unit 1010. In step S6020, the object dimension measuring unit 1030 performs dimension measurement enable/disable determination processing of analyzing the referred captured image and determining whether the image is appropriate for dimension measurement of the measurement target part. The determination result is stored in an area (not shown) of the RAM 205. Details of the dimension measurement enable/disable determination processing will be described later with reference to the flowchart of FIG. 7.

In step S6030, the object dimension measuring unit 1030 refers to the RAM 205 and confirms the result of determining whether dimension measurement is possible. Upon determining that dimension measurement is possible, the process advances to step S6040. Upon determining that dimension measurement is not possible, the process advances to step S6050.

In step S6040, the object dimension measuring unit 1030 performs dimension measurement processing of the target part. In step S6050, the object dimension measuring unit 1030 waits until the image stored in the image storage unit 1010 is updated to the next image. If the image is updated, the process returns to step S6010 to perform the same processing again.

As described above, the object dimension measuring unit 1030 refers to the image in the image storage unit 1010 (S6010), performs processing of determining whether dimension measurement of fingers is possible (S6020), and determines whether measurement is possible (S6030). Upon determining that measurement is possible, the object dimension measuring unit 1030 performs dimension measurement processing of fingers (S6040). Upon determining that measurement is impossible, the object dimension measuring unit 1030 waits updating to the next image (S6050). Then, the object shape estimation unit 1020 refers to the dimension measurement values of each part measured by the object dimension measuring unit 1030 and generates the models of the three-dimensional shapes of the fingers.

Figure 7:
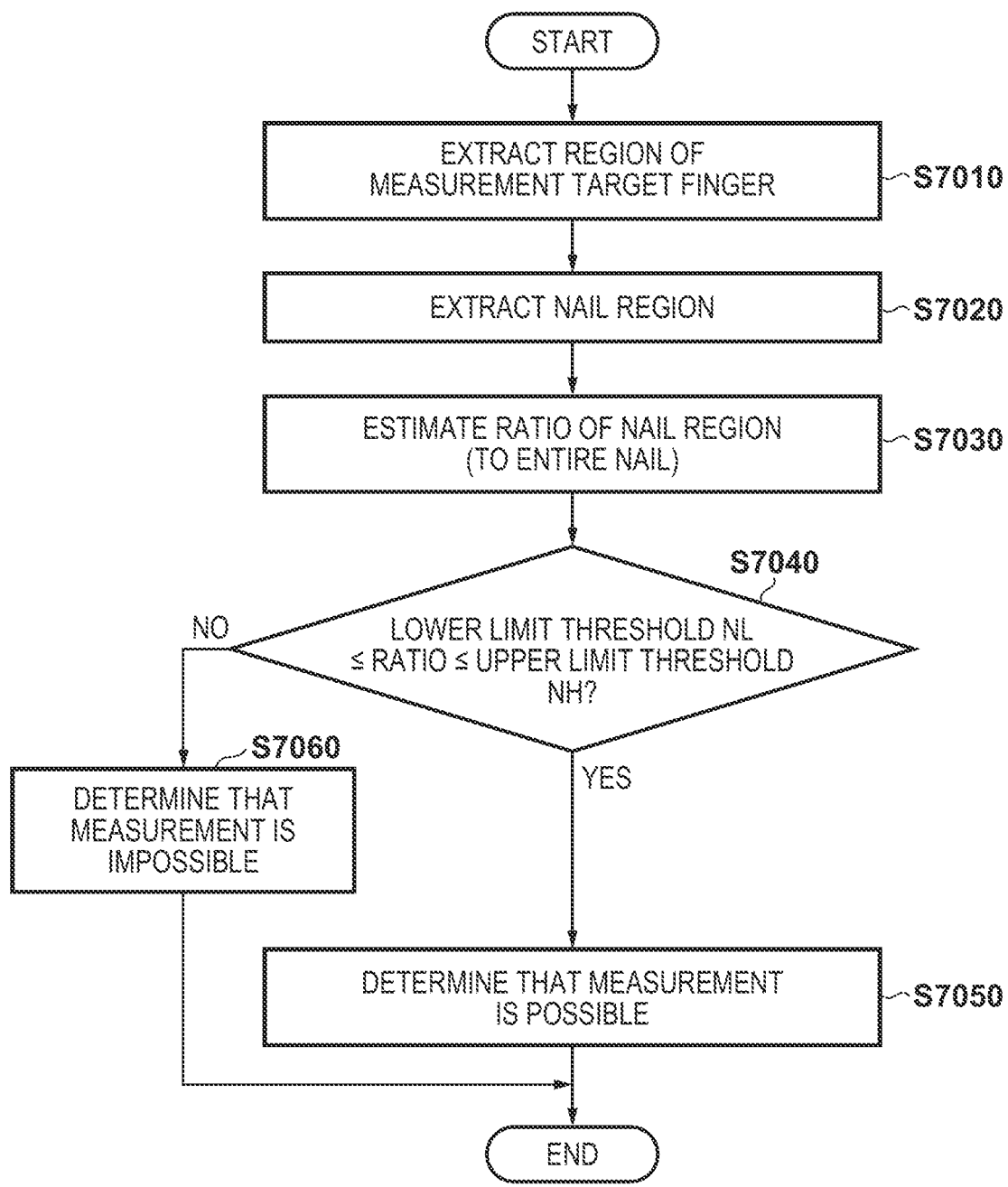
FIG. 7 is a flowchart showing dimension measurement enable/disable determination processing of the information processing apparatus according to the first embodiment.

Details of processing contents of the dimension measurement enable/disable determination processing in step S6020 will be described next with reference to the flowchart of FIG. 7. In the first embodiment, an example in which it is determined, using the ratio of a captured nail, whether image capturing just from beside which is appropriate for measurement of a thickness can be performed will be described.

In step S7010, the object dimension measuring unit 1030 extracts the region of a finger as a measurement target. As for the finger region extraction, the entire region of the target object is extracted based on the color information of pixels, as in the three-dimensional shape estimation described with reference to FIG. 4. A contour is obtained from edge information obtained by binarizing the image of the region, thereby specifying the region of the finger.

In step S7020, the object dimension measuring unit 1030 extracts a nail region from the obtained finger region. As for the nail region extraction, a closed region surrounded by an edge contour in a fingertip region is detected from the above-described edge information, thereby extracting the nail region. Note that as for the nail region extraction, any other method capable of extracting a nail region, for example, a method of separately capturing a nail region and registering the color information of the nail region in advance, comparing a color with the registered color information, and extracting the nail region from the finger region can be applied.

In step S7030, the object dimension measuring unit 1030 estimates the ratio of the captured nail to the entire nail with respect to the extracted nail region. To obtain the ratio, the aspect ratio of the nail is obtained in advance from an image obtained by capturing the whole nail from the front side. When "aspect ratio of nail in current image÷aspect ratio of whole nail" is calculated, the ratio can approximately be estimated. An example of an image to estimate the ratio will be described later with reference to FIGS. 8A and 8B.

In step S7040, the object dimension measuring unit 1030 determines whether the ratio obtained in step S7030 falls within a threshold range. As the range of a ratio to determine an appropriate image, a lower limit threshold NL and an upper limit threshold NH are defined in advance. If the ratio falls within this threshold range, the process advances to step S7050 to determine that measurement is possible. On the other hand, if the ratio falls outside the threshold range, the process advances to step S7060 to determine that measurement is impossible. The object dimension measuring unit 1030 writes the determination result in an area (not shown) of the RAM 205. The determination result is referred to in step S6030 of FIG. 6.

For example, when it is defined that the ratio of a captured nail preferably falls within the range of 0.1 to 0.3, NL=0.1 and NH=0.3 are set. If the ratio is 0.2, it falls within this range. Since this is the preferable range, it is determined that dimension measurement is possible.

The procedure of obtaining the aspect ratio of a nail described with reference to FIG. 7 will be described next with reference to FIGS. 8A and 8B using the schematic view of a captured image. FIG. 8A is a view showing an image including a capturing target finger 8000 to be determined. A nail region 8010 is extracted as described above. A length 8020 of the nail region in the longitudinal direction is obtained, a length 8030 in the widthwise direction is similarly obtained, and the aspect ratio is calculated. FIG. 8B is a view showing an image obtained by capturing a capturing target finger 8040 such that the nail faces the front side. A nail region 8050 is extracted in a similar manner, a length 8060 of the nail region in the longitudinal direction is obtained, a length 8070 in the widthwise direction is similarly obtained, and the aspect ratio is calculated.

A description will be made using detailed values as an example. If the length 8020 of the nail region in the longitudinal direction in the determination target image is 10 mm, and the length 8030 in the widthwise direction is 2 mm, the aspect ratio of the determination target image is 0.2. Similarly, if the length 8060 of the nail region in the longitudinal direction in the image in which the whole nail is captured is 10 mm, and the length 8070 in the widthwise direction is 10 mm, the aspect ratio is 1.0.

The aspect ratio of the nail in a case in which the whole nail is captured is 10 mm÷10 mm=1.0, the aspect ratio of the determination target image is 2 mm÷10 mm=0.2, the ratio is 0.2÷1.0=0.2, and the ratio can be estimated as 0.2.

Figure 9:
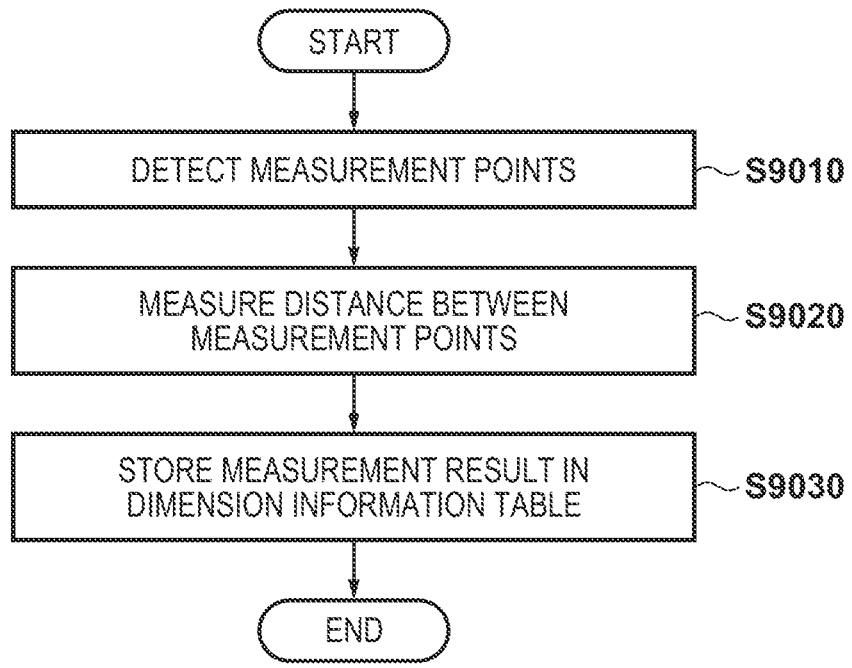
FIG. 9 is a flowchart showing target part dimension measurement processing of the information processing apparatus according to the first embodiment.

The procedure of dimension measurement processing of the target part in step S6040 will be described next with reference to the flowchart of FIG. 9. In step S9010, the object dimension measuring unit 1030 detects measurement points from a measurement target image. The measurement target image is an image for which it is determined by the above-described dimension measurement enable/disable determination processing that measurement is possible. The image is referred to in the image storage unit 1010. Points (points corresponding to two ends of dimension measurement) used to measure the dimensions of each part of a finger are detected from the feature of the image, as will be described later in detail with reference to FIG. 10.

In step S9020, the object dimension measuring unit 1030 measures the distances between the detected measurement points. The three-dimensional position of each measurement point is obtained using a method of obtaining a three-dimensional position by stereo matching and triangulation, thereby calculating the distance between two measurement points. Note that any other method such as a method of capturing an object serving as a dimension indicator in an image and obtaining the distance based on the ratio to the size of the indicator may be used as long as it can obtain the distance between two points from the image.

In step S9030, the object dimension measuring unit 1030 stores the obtained distance in a dimension information table (an area (not shown) of the RAM 205) as the dimension information of each part. Details of the dimension information table will be described later with reference to FIG. 11.

Figure 10:
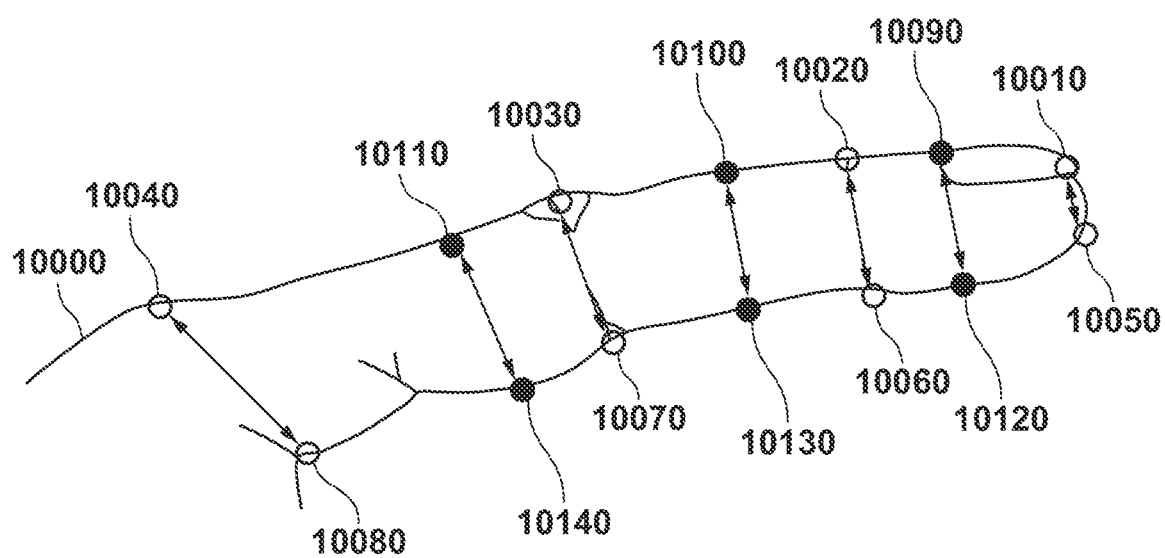
FIG. 10 is a schematic view for explaining an example of an image for which target part dimension measurement according to the first embodiment is performed.

Here, FIG. 10 is a schematic view showing an example of a measurement target image. For a measurement target finger 10000, measurement points are detected at the fingertip, the joints, and the intermediate points between the joints. In FIG. 10, the measurement points are indicated by open circles and full circles for the descriptive convenience. As for the detection of the measurement points, a tip portion 10010 of the nail at the fingertip is detected first. Then, measurement points are sequentially detected from there on the surfaces of the joints based on the features of wrinkles. An outer side 10020 of the first joint, an outer side 10030 of the second joint, and an outer side 10040 of the third joint are detected. Note that in this embodiment, the outer side indicates the side of the back of a hand (the nail side of a finger), and the inner side indicates the palm side (the side opposite to the nail of a finger).

Next, a tip portion 10050 on the inner side corresponding to the foot of a perpendicular from the tip portion 10010 of the nail at the fingertip is detected. In the same way as on the outer side, an inner side 10060 of the first joint, an inner side 10070 of the second joint, and an inner side 10080 of the third joint are detected.

To measure the thickness between the joints, a measurement point 10090 between the fingertip and the first joint, a measurement point 10100 between the first joint and the second joint, and a measurement point 10110 between the second joint and the third joint are detected. Similarly, on the inner side as well, a measurement point 10120 between the fingertip and the first joint, a measurement point 10130 between the first joint and the second joint, and a measurement point 10140 between the second joint and the third joint are detected. The measurement point between joints may be defined just at the center between the joints or may be defined at the position of a predetermined ratio (for example, 4:6).

The distance between each pair of measurement points is detected from the thus detected measurement points to measure the thickness. At the fingertip, the distance between the measurement point 10010 and the measurement point 10050 is measured. Between the fingertip and the first joint, the distance between the measurement point 10090 and the measurement point 10120 is measured. At the first joint, the distance between the measurement point 10020 and the measurement point 10060 is measured. In this way, the distances between all pairs of measurement points are calculated.

Next, FIG. 11 is a table showing an example of the dimension information table that stores the measured distance of each part described with reference to FIGS. 9 and 10. A dimension information table 11000 is a table that stores information about the dimensions of each part according to the definition of the three-dimensional model of the hand described with reference to FIG. 5.

First, a part name 11010 is registered as the label of each row, and a part dimension 11020 is defined as the label of each column. As the dimensions of a part, a height 11030 of a part, a width 11070 and a depth 11080 of an upper portion (JU) 11040, a width 11090 and a depth 11100 of a middle portion (JM) 11050, and a width 11120 and a depth 11130 of a lower portion (JL) 11060 are defined as labels. In this table, the pieces of dimension information of each part previously measured by the dimension measurement processing shown in FIG. 9 are stored. When all pieces of information in the dimension information table 11000 are obtained by the dimension measurement processing, the dimensions of each part of the three-dimensional model of the hand shown in FIG. 5 are determined.

As described above, in this embodiment, after an image appropriate to measure the dimensions of a measurement target image is determined, the dimensions of each part are measured, and the three-dimensional model of the hand is generated based on the obtained dimensions. According to this embodiment, it is possible to automatically collect accurate dimension data without time and effort and generate a model of a finger. In addition, when contact determination or the like is performed using the thus generated three-dimensional model, accurate contact determination processing or the like can be implemented.

Second Embodiment

<Outline>

In the first embodiment, an example in which it is determined, using the ratio of a captured nail, whether image capturing just from beside which is appropriate for measurement of a thickness (dimension) can be performed has been described. On the other hand, in the second embodiment, an example in which it is determined, using the information of the ratio of a wrinkle region on the outer side of a finger to the wrinkle region on the inner side, whether image capturing just from beside which is appropriate for measurement of a thickness (dimension) can be performed will be described.

In this embodiment, the arrangement of an information processing apparatus 1 described in the first embodiment is not changed, and part of processing executed by an object dimension measuring unit 1030 is changed. That is, the processing contents (corresponding to the flowchart of FIG. 7 in the first embodiment) of dimension measurement enable/disable determination processing of a target part in step S6020 described with reference to FIG. 6 in the first embodiment are changed.

<Processing>

Figure 12:
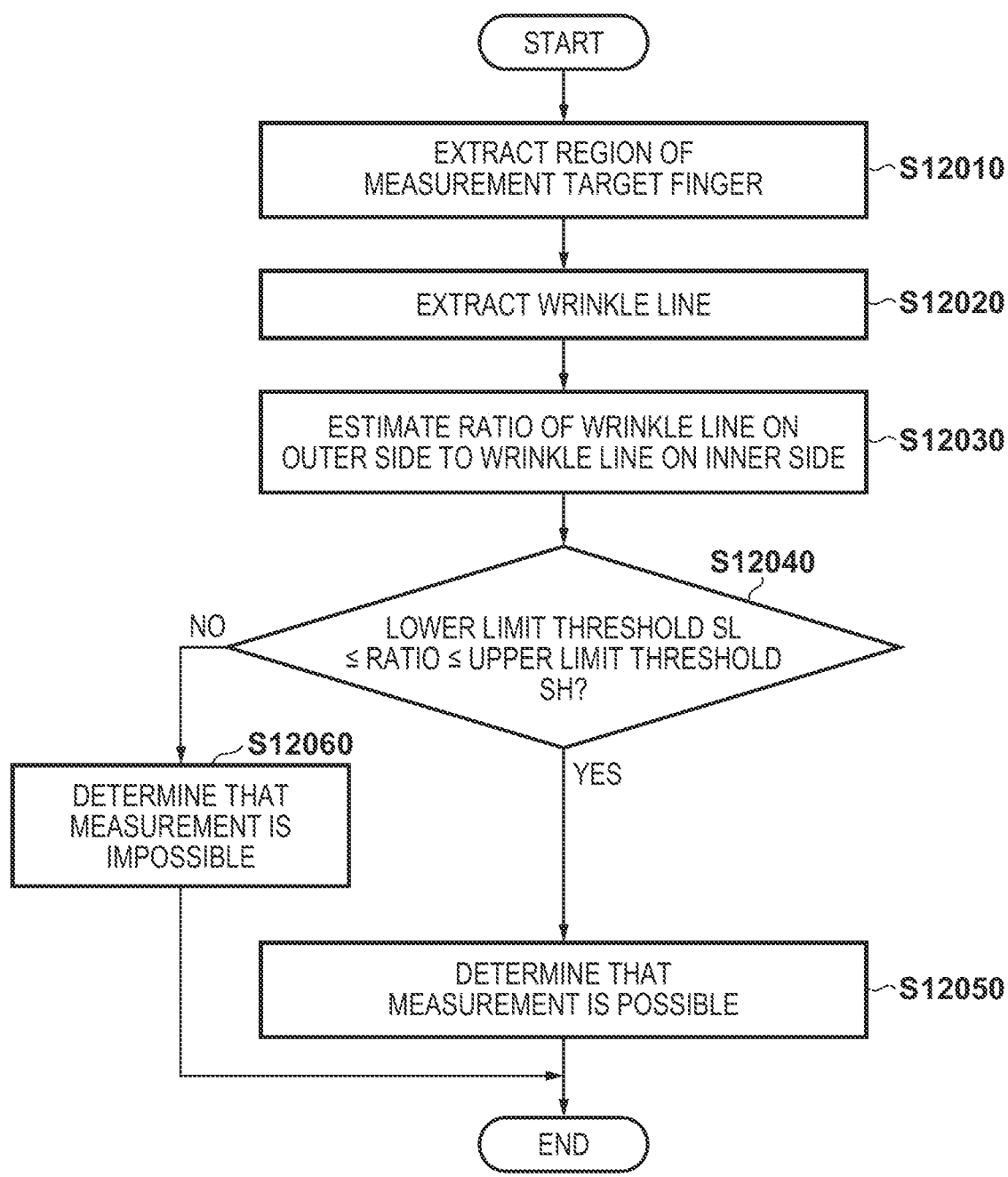
FIG. 12 is a flowchart showing dimension measurement enable/disable determination processing of an information processing apparatus according to the second embodiment.

The procedure of dimension measurement enable/disable determination processing of determining, using the ratio of a wrinkle region on the outer side of a finger to the wrinkle region on the inner side, whether image capturing just from beside which is appropriate for measurement of a thickness can be performed will be described with reference to the flowchart of FIG. 12.

In step S12010, the object dimension measuring unit 1030 analyzes a captured image and extracts the region of a finger as a measurement target. The finger region extraction method has already been described in the first embodiment, and a description thereof will be omitted here.

In step S12020, the object dimension measuring unit 1030 extracts a wrinkle line from the obtained finger region. The wrinkle extraction is performed by extracting wrinkle lines from edge information obtained by binarizing the image and extracting a line having a predetermined thickness or more to exclude fine wrinkles from the lines.

In step S12030, for the extracted wrinkle line, the object dimension measuring unit 1030 calculates the ratio of the distance of the wrinkle line on the outer side from the finger contour to the distance of the wrinkle line on the inner side from the finger contour, and estimates the ratio of the wrinkle line captured on the outer side. An example of an image to estimate the wrinkle ratio will be described later with reference to FIG. 13.

In step S12040, the object dimension measuring unit 1030 determines whether the ratio obtained in step S12030 falls within a threshold range. As the range of a ratio to determine an appropriate image, a lower limit threshold SL and an upper limit threshold SH are defined in advance. If the ratio falls within this threshold range, the process advances to step S12050 to determine that measurement is possible. On the other hand, if the ratio falls outside the threshold range, the process advances to step S12060 to determine that measurement is impossible. The object dimension measuring unit 1030 writes the determination result in an area (not shown) of a RAM 205. The determination result is referred to in step S6030 of FIG. 6.

For example, when it is defined that the ratio of wrinkles captured on the outer side preferably falls within the range of 0.4 to 0.6, SL=0.3 and SH=0.5 are set. If the estimated ratio is 0.4, it falls within this threshold range. Since this is the preferable range, it is determined that dimension measurement is possible.

Figure 13:
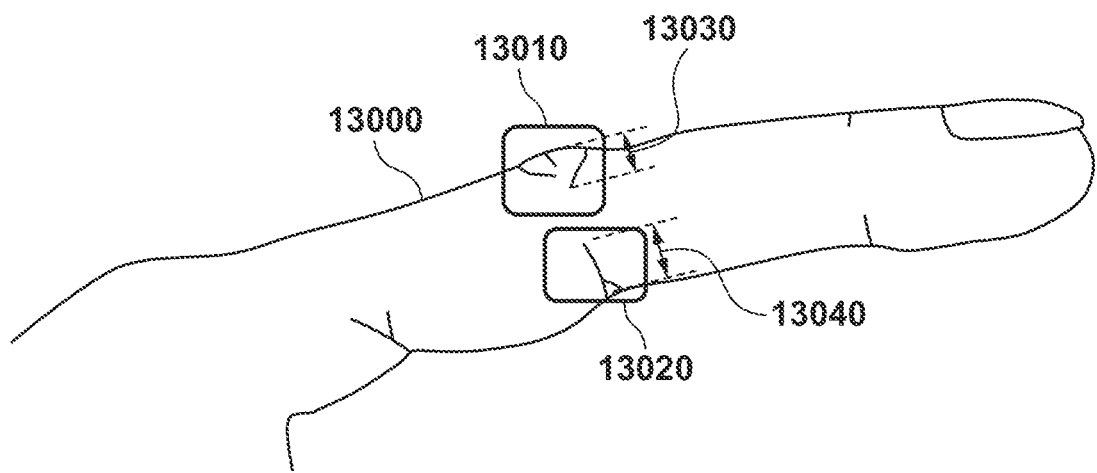
FIG. 13 is a schematic view for explaining an example of a target image for which dimension measurement enable/disable determination according to the second embodiment is performed.

The procedure of obtaining a wrinkle ratio will be described here with reference to FIG. 13 using the schematic view of a captured image. FIG. 13 shows an image including a capturing target finger 13000 to be determined. A line 13010 of wrinkles on the outer side and a line 13020 of the wrinkles on the inner side are extracted as described above. A vertical distance 13030 from the contour of the finger to the line of the wrinkles on the outer side is obtained, and similarly, a vertical distance 13040 from the contour of the finger to the line of the wrinkles on the inner side is obtained. For example, if the vertical distance of the line of the wrinkles on the outer side is 4 mm, and the vertical distance of the line of the wrinkles on the inner side is 6 mm, the estimated ratio is 0.4.

According to this embodiment, it is possible to determine, using the information of wrinkles of a finger, whether image capturing just from beside which is appropriate for measurement of a thickness can be performed.

Third Embodiment

<Outline>

In the first embodiment, an example in which it is determined, using the ratio of a captured nail, whether image capturing just from beside which is appropriate for measurement of a thickness (dimension) can be performed has been described. On the other hand, in the third embodiment, an example in which it is determined, using the information of the degree of similarity between the color of a target on the outer side and that on the inner side, whether image capturing just from beside which is appropriate for measurement of a thickness (dimension) can be performed will be described. This method is a method of doing determination using the fact that the tint changes between the outer side of a hand and the inner side.

In this embodiment, the arrangement of an information processing apparatus 1 described in the first embodiment is not changed, and part of processing executed by an object dimension measuring unit 1030 is changed. That is, the processing contents (corresponding to the flowchart of FIG. 7 in the first embodiment) of dimension measurement enable/disable determination processing of a target part in step S6020 described with reference to FIG. 6 in the first embodiment are changed.

<Processing>

Figure 14:
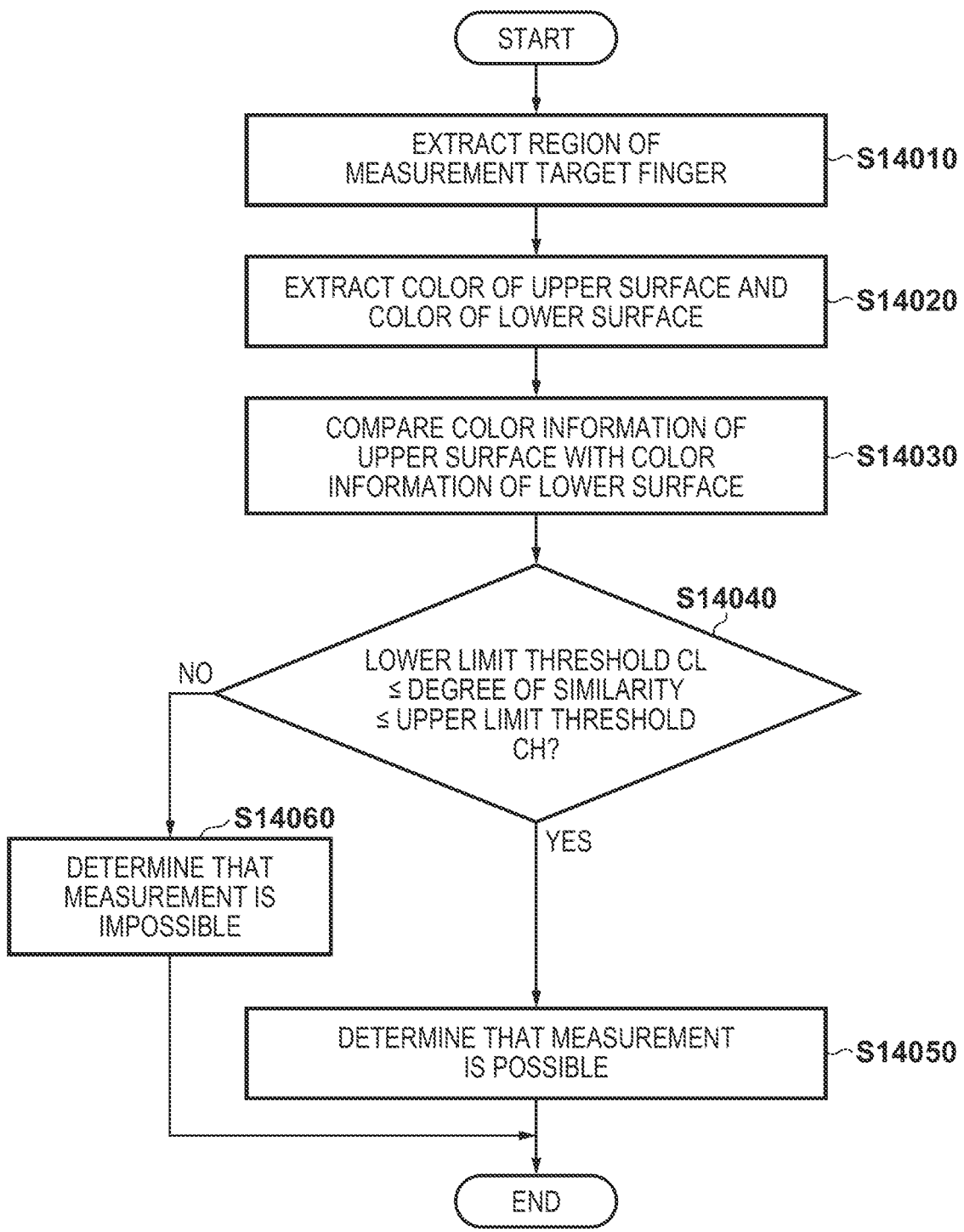
FIG. 14 is a flowchart showing dimension measurement enable/disable determination processing of an information processing apparatus according to the third embodiment.

The procedure of dimension measurement enable/disable determination processing of determining, using the degree of similarity between the color of a finger on the outer side and that on the inner side, whether image capturing just from beside which is appropriate for measurement of a thickness can be performed will be described with reference to the flowchart of FIG. 14.

In step S14010, the object dimension measuring unit 1030 analyzes a captured image and extracts the region of a finger as a measurement target. The finger region extraction method has already been described in the first embodiment, and a description thereof will be omitted here.

In step S14020, the object dimension measuring unit 1030 extracts color information on the outer side and that on the inner side from the obtained finger region. In step S14030, the object dimension measuring unit 1030 compares the pieces of color information (for example, a histogram for each of R, G, and B) extracted on the outer and inner sides and obtains the degree of similarity. An example of an image to estimate the degree of similarity of the color will be described later with reference to FIG. 15.

In step S14040, the object dimension measuring unit 1030 determines whether the degree of similarity obtained in step S14030 falls within a threshold range. As the range of a ratio to determine an appropriate image, a lower limit threshold CL and an upper limit threshold CH are defined in advance. If the degree of similarity falls within the threshold range, the process advances to step S14050 to determine that measurement is possible. On the other hand, if the degree of similarity falls outside the threshold range, the process advances to step S14060 to determine that measurement is impossible.

For example, when it is defined that the degree of similarity preferably falls within the range of 80 to 90, CL=80 and CH=90 are set. If the obtained degree of similarity is 84, it falls within this threshold range. Since this is the preferable range, it is determined that dimension measurement is possible.

Figure 15:
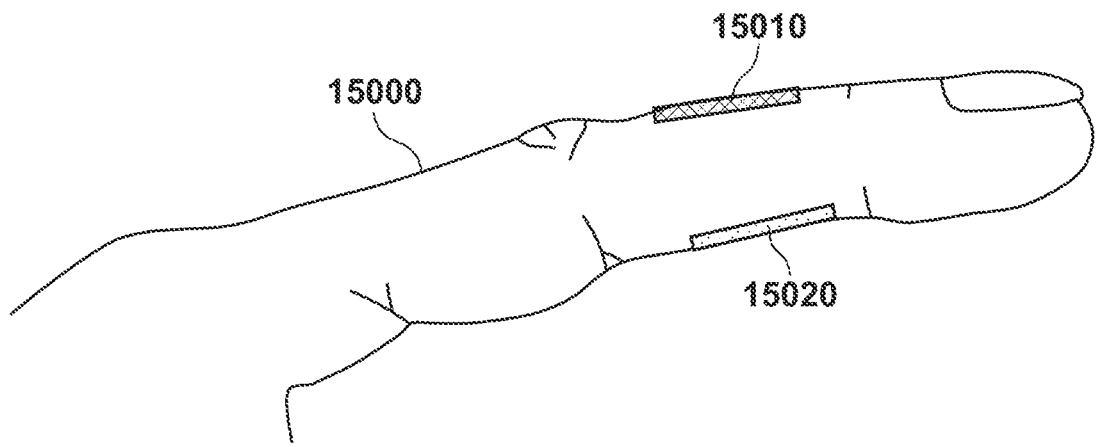
FIG. 15 is a schematic view for explaining an example of a target image for which dimension measurement enable/disable determination according to the third embodiment is performed.

The procedure of obtaining the degree of similarity of the color will be described next with reference to FIG. 15 using the schematic view of a captured image. FIG. 15 shows an image including a capturing target finger 15000 to be determined. Color information (for example, a histogram for each of R, G, and B) is extracted from each of a surface region 15010 on the outer side and a surface region 15020 on the inner side as described above. The surface region 15010 on the outer side and the surface region 15020 on the inner side are rectangular regions having the same size, and color information is extracted from each rectangular region. Then, the degree of similarity of the color information is calculated (for example, the histograms are compared, the area difference and a common portion area are calculated, and the degree of similarity is calculated by common portion area÷(area difference+common portion area)). As for the calculation of the degree of similarity, a method other than comparing the histograms for each of R, G, and B may be used. The color format and the calculation method are not limited to those described in this embodiment, and any method capable of obtaining the degree of similarity is usable.

According to this embodiment, it is possible to determine, using the degree of similarity between the color of the target on the outer side and that on the inner side, whether image capturing just from beside which is appropriate for measurement of a thickness can be performed.

Fourth Embodiment

<Outline>

In the first embodiment, it is determined, using the ratio of a captured nail, whether image capturing just from beside which is appropriate for measurement of a thickness (dimension) can be performed. On the other hand, in the fourth embodiment, an example in which it is determined, using the information of a detection result of a feature (for example, hair) projecting from a region of a target, whether image capturing just from beside which is appropriate for measurement of a thickness (dimension) can be performed will be described. This method is a method of doing determination using the fact that if image capturing just from beside is performed, hair is detected on the outer side of a hand or a finger.

In this embodiment, the arrangement of an information processing apparatus described in the first embodiment is not changed, and part of processing executed by an object dimension measuring unit 1030 is changed. That is, the processing contents (corresponding to the flowchart of FIG. 7 in the first embodiment) of dimension measurement enable/disable determination processing of a target part in step S6020 described with reference to FIG. 6 in the first embodiment are changed.

<Processing>

Figure 16:
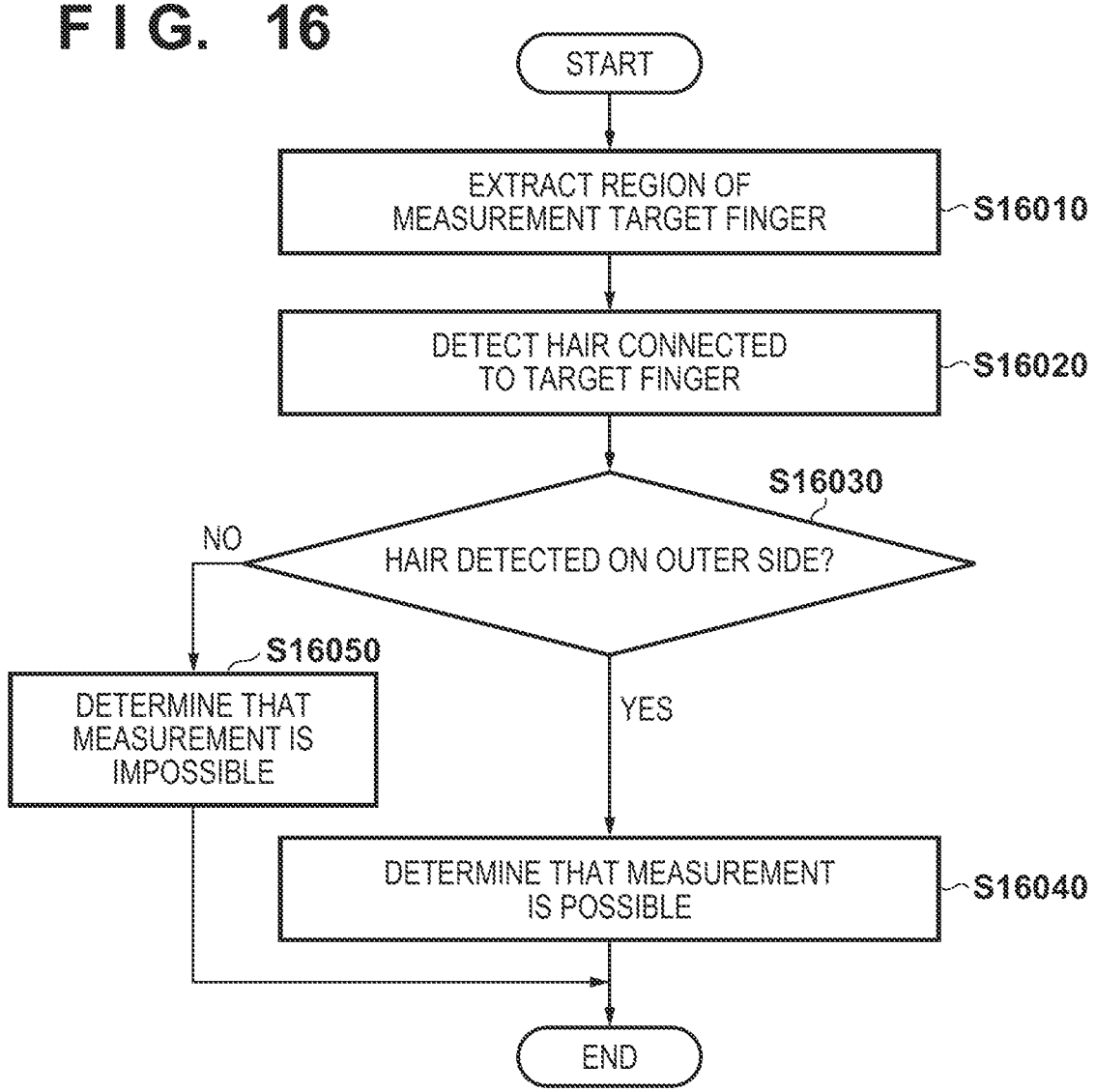
FIG. 16 is a flowchart showing dimension measurement enable/disable determination processing of an information processing apparatus according to the fourth embodiment.

The procedure of dimension measurement enable/disable determination processing of determining, using the detection result of a feature (hair), whether image capturing just from beside which is appropriate for measurement of a thickness can be performed will be described with reference to the flowchart of FIG. 16.

In step S16010, the object dimension measuring unit 1030 analyzes a captured image and extracts the region of a finger as a measurement target. The finger region extraction method has already been described in the first embodiment, and a description thereof will be omitted here.

In step S16020, the object dimension measuring unit 1030 detects hair projecting from the obtained finger region. As for the hair detection method, a line projecting from the contour of the finger is detected from edge information obtained by binarizing a neighboring region of the finger region obtained in step S16010. A line component projecting from the contour of the finger is detected as hair. To reduce a determination error, processing of excluding a line having a predetermined length or more as noise from the target is also performed. An example of an image to detect hair will be described later with reference to FIG. 17.

In step S16030, the object dimension measuring unit 1030 determines, based on the result of hair detection performed in step S16020, whether hair is detected on the outer side. If hair is detected, the process advances to step S16040 to determine that measurement is possible. On the other hand, if hair cannot be detected, the process advances to step S16050 to determine that measurement is impossible.

Figure 17:
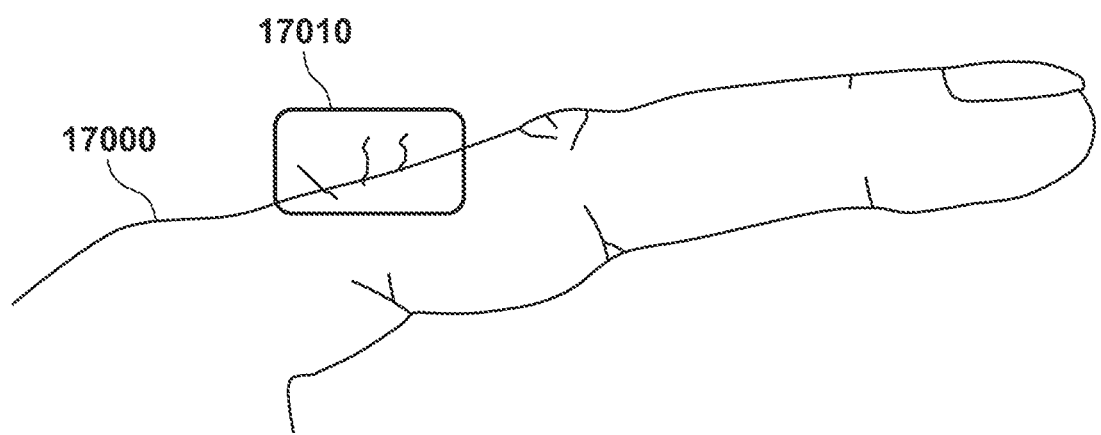
FIG. 17 is a schematic view for explaining an example of a target image for which dimension measurement enable/disable determination according to the fourth embodiment is performed.

The procedure of detecting hair will be described next with reference to FIG. 17 using the schematic view of a captured image. FIG. 17 shows an image including a capturing target finger 17000 to be determined. Hair detection processing is performed using the method described with reference to FIG. 16 for a neighboring region 17010 of the surface on the outer side.

According to this embodiment, it is possible to determine, using the hair detection result on the outer side of the target, whether image capturing just from beside which is appropriate for measurement of a thickness can be performed.

Fifth Embodiment

<Outline>

In the first embodiment, it is determined, using the ratio of a captured nail, whether image capturing just from beside which is appropriate for measurement of a thickness (dimension) can be performed.

On the other hand, in the fifth embodiment, guide display is performed to promote a user to take an orientation viewed just from beside which is appropriate for measurement of a thickness (dimension). When the user adjusts the orientation of a finger in accordance with the displayed guide, image capturing in a pose appropriate for measurement of a thickness can be performed. In addition, an example in which it is determined, based on the degree of coincidence between the guide and the shape of the hand, whether image capturing just from beside which is appropriate for measurement of a thickness (dimension) can be performed will be described.

Figure 6:
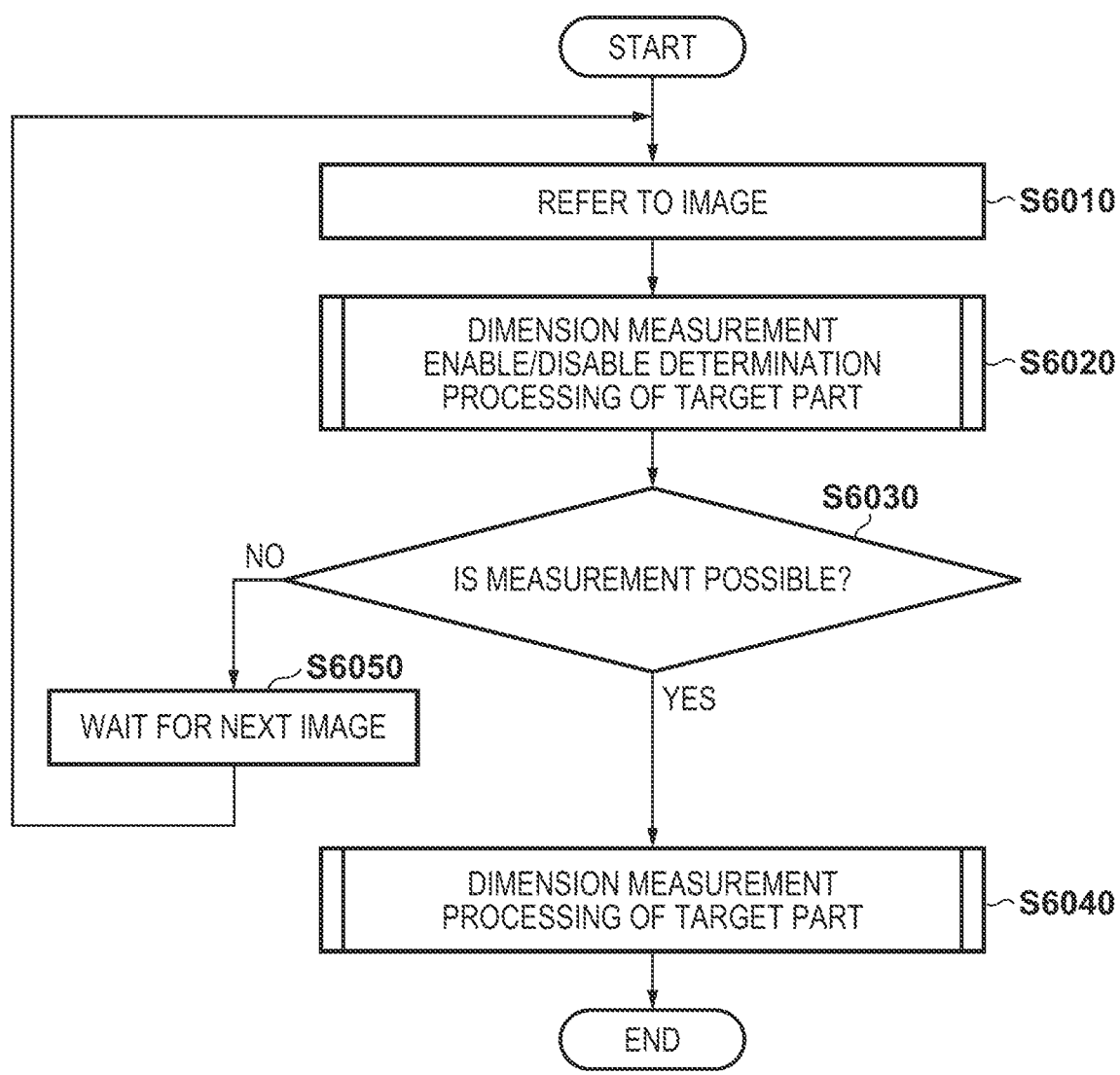
FIG. 6 is a flowchart showing dimension measurement processing of the information processing apparatus according to the first embodiment.

In this embodiment, a certain unit is added to the arrangement of an information processing apparatus described in the first embodiment, and part of processing executed by an object dimension measuring unit 1030 is changed. That is, since FIG. 1 of the first embodiment and the processing contents (corresponding to the flowchart of FIG. 7 in the first embodiment) of dimension measurement enable/disable determination processing of a target part in step S6020 described with reference to FIG. 6 are changed, the difference will be described with reference to FIGS. 18 to 20.

<Functional Arrangement of Information Processing Apparatus>

Figure 18:
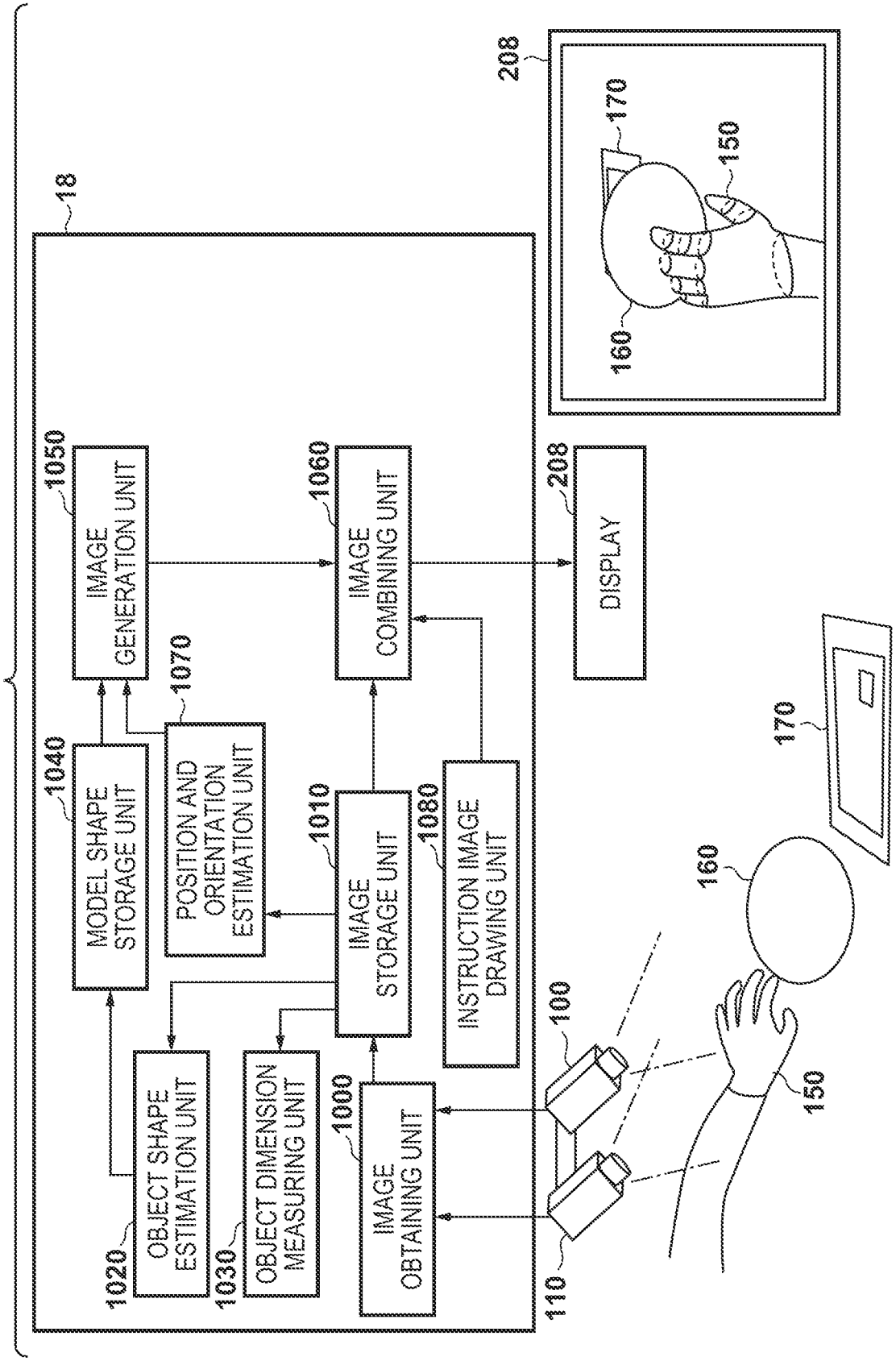
FIG. 18 is a block diagram showing the arrangement of an information processing apparatus according to the fifth embodiment.

FIG. 18 is a block diagram showing the functional arrangement of a physical object information processing apparatus to which an instruction image drawing unit configured to display a guide to a user is added.

An information processing apparatus 18 has a functional arrangement formed by adding an instruction image drawing unit 1080 to the block diagram of FIG. 1. All the remaining components are common to those in FIG. 1, and a description of the common parts will be omitted.

The instruction image drawing unit 1080 performs processing of drawing an orientation guide image to instruct the shape of a finger to the user at the time of dimension measurement processing, and sends the drawn image to an image combining unit 1060. The image combining unit 1060 performs display control processing of additionally superimposing the guide display. When performing measurement, the guide image is thus superimposed and displayed on a display 208.

Figure 19:
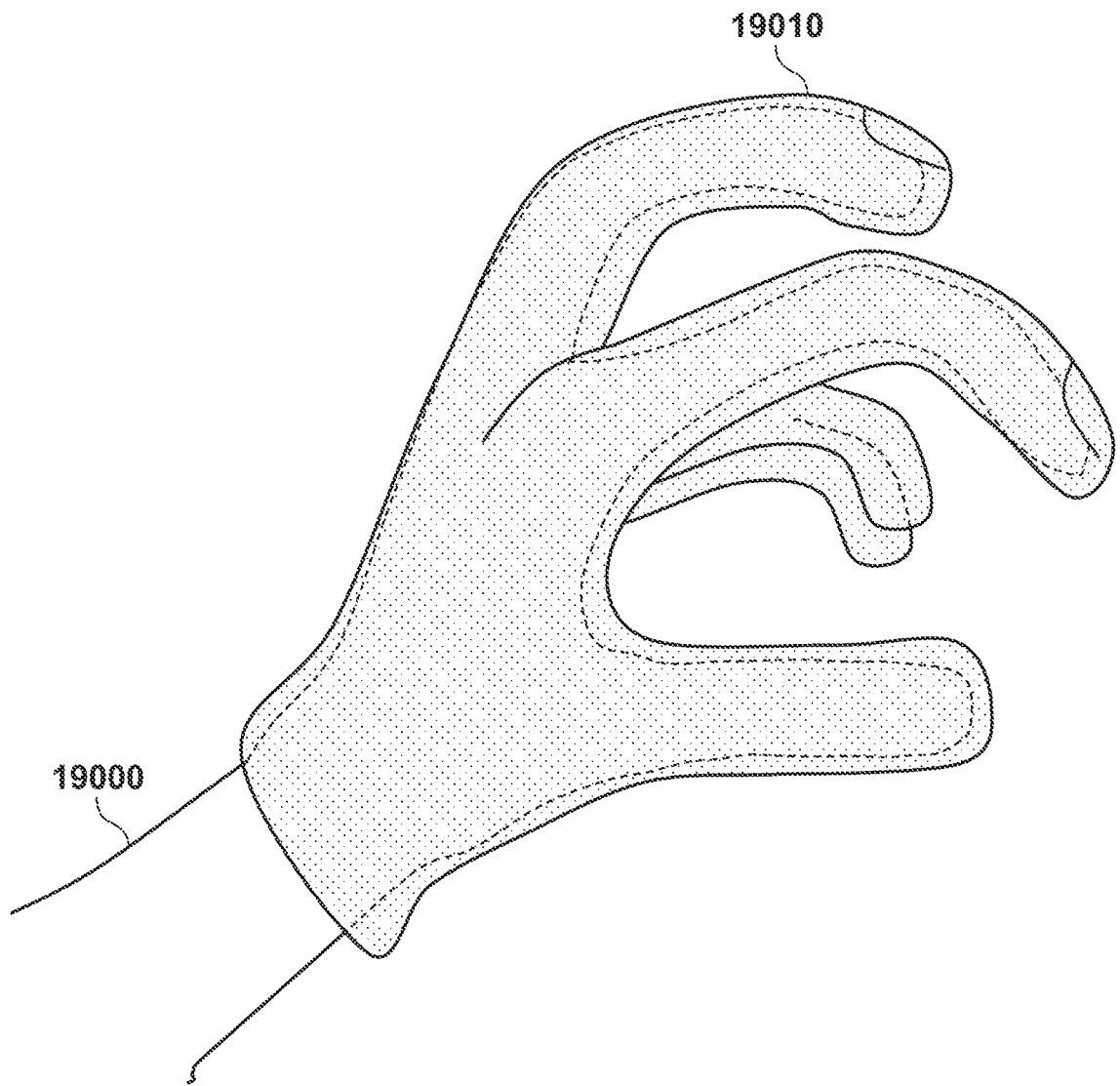
FIG. 19 is a schematic view for explaining an example of guide display according to the fifth embodiment.

FIG. 19 is a schematic view showing an example of an image on which the guide image is actually superimposed. A semitransparent guide display 19010 representing the shape orientation of the hand is superimposed on the image of a hand 19000 of the user. The user performs an operation of changing and adjusting the shape orientation of the hand while viewing this guide such that his/her fingers coincide with the guide.

When the guide is displayed to instruct the user to coincide the fingers with the shape, image capturing an orientation viewed just from beside which is appropriate for measurement of a thickness can be performed.

<Processing>

The procedure of processing of determining, using degree-of-coincidence information for a guide to a captured image of fingers coincided with the guided by the user, whether image capturing just from beside which is appropriate for measurement of a thickness can be performed will be described with reference to the flowchart of FIG. 20.

In step S20010, the object dimension measuring unit 1030 analyzes a captured image and extracts the region of a finger as a measurement target. The finger region extraction method has already been described in the first embodiment, and a description thereof will be omitted here.

In step S20020, the object dimension measuring unit 1030 calculates the degree of coincidence between the obtained finger region and a guide region. To obtain the degree of coincidence of the region, the number of pixels in a region where the guide and the finger do not overlap and the number of pixels in a region where the finger projects from the guide are obtained. Then, the degree of coincidence is obtained by "degree of coincidence=(number of pixels in guide region−(number of pixels in region where guide and finger do not overlap+number of pixels in region where finger projects from guide))÷number of pixels in guide region".

In step S20030, the object dimension measuring unit 1030 determines whether the obtained degree of coincidence is not less than a lower limit threshold GL. If the degree of coincidence is not less than the threshold, the process advances to step S20040 to determine that measurement is possible. On the other hand, if the degree of coincidence is less than the threshold, the process advances to step S20050 to determine that measurement is impossible.

According to this embodiment, it is possible to determine, using degree-of-coincidence information to the guide, whether image capturing just from beside which is appropriate for measurement of a thickness can be performed and measure the thickness.

As described above, according to each embodiment of the present invention, the dimensions of parts of a measurement target object are measured using an image appropriate for the measurement of the parts of the measurement target object. This makes it possible to measure the dimensions of each part at a higher accuracy. In addition, a three-dimensional model is generated by directly referring to the dimension data of each part measured from an image captured by the image capturing apparatus and superimposed. This makes it possible to save the time and effort in inputting the dimensions of each part and generate a model based on dimension data that coincides with the captured target object.

Note that in the above-described embodiments, the description has been made using fingers as an example. However, the present invention is not limited to the fingers. For example, the present invention is also applicable to a robot hand other than a 5-finger hand or toes.

According to the present invention, it is possible to collect accurate dimension data without time and effort and generate a model of a finger.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-101141, filed May 22, 2017, which is hereby incorporated by reference herein in its entirety.

What is claimed is:

1. An information processing apparatus comprising:
a memory configured to store instructions; and
a processor communicatively connected to the memory and configured to execute the instructions to function as:
   a determination unit configured to analyze a captured image of a finger and determine whether the captured image is appropriate to measure a dimension of a part of the finger based on a predefined criterion;
   a measuring unit configured to measure a dimension of the finger using the captured image determined to be appropriate by the determination unit; and
   a generation unit configured to generate a model of a three-dimensional shape of the finger based at least on the measured dimension,
   wherein the predefined criterion includes (a) a ratio of an area of a nail region in the captured image to an area of an entire nail region in a front image of the finger or (b) a ratio of wrinkles on a nail side of the finger in the captured image to wrinkles on a palm side of the finger in the captured image.

2. The apparatus according to claim 1, wherein the processor is further configured to execute the instructions to function as:
   a finger region extraction unit configured to extract a finger region from the captured image;
   a nail region extraction unit configured to extract the nail region from the finger region; and
   a ratio estimation unit configured to estimate the ratio of the area of the extracted nail region to the area of the entire nail region in the front image of the finger.

3. The apparatus according to claim 1,
wherein the processor is further configured to execute the instructions to function as a detection unit configured to detect hair on an outer side of the finger, and
wherein the determination unit further performs the determination based on a detection result of the detection unit.

4. The apparatus according to claim 1, further comprising a display configured to display a guide image that instructs an orientation of the finger appropriate to measure the dimension of the part of the finger.

5. The apparatus according to claim 4,
wherein the processor is further configured to execute the instructions to function as a calculation unit configured to calculate a degree of coincidence between the guide image and the finger, and
wherein the determination unit further performs the determination based on information of the degree of coincidence.

6. The apparatus according to claim 1, wherein the measuring unit is further configured to detect measuring points from the captured image and measure distances between the detected measurement points.

7. The apparatus according to claim 6, wherein the measuring unit is further configured to register the measured distances in a table.

8. The apparatus according to claim 1, wherein the processor is further configured to execute the instructions to function as:
   a position and orientation estimation unit configured to estimate a position and orientation of an image capturing device which captured the captured image; and
   an image generation unit configured to generate an image based on the model and the position and orientation of the image capturing device.

9. The apparatus according to claim 8, wherein the processor is further configured to execute the instructions to function as a combining unit configured to combine the image generated by the image generation unit with the captured image.

10. The apparatus according to claim 9, further comprising a display configured to display the combined image.

11. The apparatus according to claim 8, wherein the image generation unit is further configured to control a rendering of a model based on a positional relationship between the model and a hand in the captured image.

12. The apparatus according to claim 1, wherein the generation unit includes a hand region extraction unit configured to extract a hand region from the captured image.

13. The apparatus according to claim 12, wherein the captured image is stereo images, and the generation unit further includes a position calculation unit configured to calculate three-dimensional positions of corresponding points by matching of points on contours of hand regions extracted from respective stereo images.

14. The apparatus according to claim 13, wherein the generation unit further includes:
a position estimation unit configured to estimate three-dimensional positions of a plurality of parts in the hand regions based on the three-dimensional positions of corresponding points; and
an identification unit configured to identify the plurality of parts based on estimated respective three-dimensional positions.

15. The apparatus according to claim 14, wherein the generation unit further includes an arrangement unit configured to arrange respective models of the plurality of parts.

16. A method of controlling an information processing apparatus, comprising:
analyzing a captured image of a finger and determining whether the captured image is appropriate to measure a dimension of a part of the finger based on a predefined criterion;
measuring a dimension of the finger using the captured image determined to be appropriate in the analyzing and determining; and
generating a model of a three-dimensional shape of the finger based at least on the measured dimension,
wherein the predefined criterion includes (a) a ratio of an area of a nail region in the captured image to an area of an entire nail region in a front image of the finger or (b) a ratio of wrinkles on a nail side of the finger in the captured image to wrinkles on a palm side of the finger in the captured image.

17. A non-transitory computer-readable storage medium storing a computer program for causing a computer to execute steps of a method of controlling an information processing apparatus, comprising:
analyzing a captured image of a finger and determining whether the captured image is appropriate to measure a dimension of a part of the finger based on a predefined criterion;
measuring a dimension of the finger using the captured image determined to be appropriate in the analyzing and determining; and
generating a model of a three-dimensional shape of the finger based at least on the measured dimension,
wherein the predefined criterion includes (a) a ratio of an area of a nail region in the captured image to an area of an entire nail region in a front image of the finger or (b) a ratio of wrinkles on a nail side of the finger in the captured image to wrinkles on a palm side of the finger in the captured image.

* * * * *